(12) United States Patent
Pan et al.

(10) Patent No.: US 11,500,196 B2
(45) Date of Patent: Nov. 15, 2022

(54) GALVO DESIGN WITH IMPROVEMENTS ON STRUCTURE STABILITY AND MIRROR PROTECTION

(71) Applicant: Beijing Voyager Technology Co., Ltd., Beijing (CN)

(72) Inventors: Anan Pan, Fremont, CA (US); Henghui Jiang, Newark, CA (US); Qin Zhou, Livermore, CA (US); Lingkai Kong, Palo Alto, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 371 days.

(21) Appl. No.: 16/869,513

(22) Filed: May 7, 2020

(65) Prior Publication Data
US 2021/0349307 A1 Nov. 11, 2021

(51) Int. Cl.
| | | |
|---|---|---|
| G02B 26/08 | (2006.01) | |
| G02B 26/10 | (2006.01) | |
| G01S 7/481 | (2006.01) | |

(52) U.S. Cl.
CPC .......... *G02B 26/105* (2013.01); *G01S 7/4817* (2013.01); *G02B 26/0816* (2013.01); *G01S 7/4813* (2013.01)

(58) Field of Classification Search
CPC . G02B 26/0816; G02B 26/105; G01S 7/4808; G01S 7/481; G01S 7/4813; G01S 7/4817; G01S 17/10
See application file for complete search history.

(56) References Cited

U.S. PATENT DOCUMENTS

| | | | | |
|---|---|---|---|---|
| 2020/0142041 A1* | 5/2020 | Gassend | ............... | G01S 7/4817 |
| 2020/0150238 A1* | 5/2020 | Smith | .................... | G01S 7/4912 |

* cited by examiner

*Primary Examiner* — Hoang X Ngo
(74) *Attorney, Agent, or Firm* — Kilpatrick Townsend & Stockton LLP

(57) ABSTRACT

Disclosed herein are techniques for improving structural stability and duration of light beam steering components in a LiDAR system. A galvo mirror assembly for light detection and ranging includes a top bracket including a first rotatable unit configured to rotate around an axis; a bottom bracket aligned with the top bracket and including a second rotatable unit configured to rotate around the axis; a mirror including a top end and a bottom end, where the top end of the mirror is coupled to the first rotatable unit of the top bracket and the bottom end of the mirror is coupled to the second rotatable unit of the bottom bracket, such that the mirror is rotatable around the axis; and an enhance plate extending between and non-rotatably coupled to the top bracket and the bottom bracket. The enhance plate is spaced apart from the mirror.

20 Claims, 14 Drawing Sheets

GALVO DESIGN WITH IMPROVEMENTS ON STRUCTURE STABILITY AND MIRROR PROTECTION

BACKGROUND OF THE INVENTION

Modern vehicles are often equipped with sensors designed to detect objects and landscape features around the vehicle in real-time to enable technologies such as lane change assistance, collision avoidance, and autonomous driving. Some commonly used sensors include image sensors (e.g., infrared or visible light cameras), acoustic sensors (e.g., ultrasonic parking sensors), radio detection and ranging (RADAR) sensors, magnetometers (e.g., passive sensing of large ferrous objects, such as trucks, cars, or rail cars), and light detection and ranging (LiDAR) sensors.

A LiDAR system typically uses a light source and a light detection system to estimate distances to environmental features (e.g., pedestrians, vehicles, structures, plants, etc.). For example, a LiDAR system may transmit a light beam (e.g., a pulsed laser beam) to illuminate a target and measure the time it takes for the transmitted light beam to arrive at the target and then return to a receiver (e.g., a photodetector) near the transmitter or at a known location. In some LiDAR systems, the light beam emitted by the light source may be steered across a region of interest according to a scanning pattern to generate a "point cloud" that includes a collection of data points corresponding to target points in the region of interest. The data points in the point cloud may be dynamically and continuously updated, and may be used to estimate, for example, a distance, dimension, and location of an object relative to the LiDAR system, often with very high fidelity (e.g., within about 5 cm).

In some implementations, the light beam emitted from the light source may be steered using mirrors, such as galvanometer (galvo) mirror scanners. The returned light beam may be directed to the photodetector using optical components, such as mirrors, prisms, and lenses. A galvo mirror may rotate about an axis to steer the light beam incident thereon. The structural stability and durability of galvo mirrors may significantly impact the performance of the LiDAR system, in particular, in mobile systems such as vehicles.

BRIEF SUMMARY OF THE INVENTION

Techniques disclosed herein relate generally to light detection and ranging (LiDAR) systems. More specifically, and without limitation, disclosed herein are techniques for improving structural stability and duration of light beam steering components in a LiDAR system. In particular, techniques disclosed herein relate to a galvanometer (galvo) assembly with stable and durable structure for steering light beam incident thereon in a compact LiDAR system that has limited space. Various inventive embodiments are described herein, including devices, units, subsystems, modules, systems, methods, and the like.

According to certain embodiments, a galvo mirror assembly for light detection and ranging includes a top bracket including a first rotatable unit configured to rotate around an axis; a bottom bracket aligned with the top bracket and including a second rotatable unit configured to rotate around the axis; a mirror including a top end and a bottom end, where the top end of the mirror is coupled to the first rotatable unit of the top bracket and the bottom end of the mirror is coupled to the second rotatable unit of the bottom bracket, such that the mirror is rotatable around the axis; and an enhance plate extending between and non-rotatably coupled to the top bracket and the bottom bracket. In some embodiments, the enhance plate is spaced apart from the mirror.

In some embodiments of the galvo mirror assembly, the top bracket may include a top enclosure. In some embodiments, the first rotatable unit may include a top bearing in the top enclosure; a top bearing shaft having a first portion and a second portion, where the first portion of the top bearing shaft is in the top bearing and is rotatable around the axis; and a top clamp structure having a first top portion and a second top portion, where the first top portion of the top clamp structure is coupled to the second portion of the top bearing shaft, and the second top portion of the top clamp structure is coupled to the top end of the mirror. In some embodiments, the enhance plate is coupled to the top enclosure.

In some embodiments of the galvo mirror assembly, the top bearing shaft may include a first hole opened at the second portion thereof, and the first top portion of the top clamp structure is at least partially in the first hole. In some embodiments, the top bearing shaft may include two first slots disposed diametrically around the first hole and extending along the axis, and the first top portion of the top clamp structure may include two first keys disposed diametrically and each inserted in a respective one of the two first slots.

In some embodiments of the galvo mirror assembly, the top bracket may further include a first fastener, and the top bearing shaft may include a second hole extending along the axis. In some embodiments, the top clamp structure may include a third hole extending along the axis, and the first fastener couples the top clamp structure to the top bearing shaft through the second hole and the third hole.

In some embodiments of the galvo mirror assembly, the top clamp structure may include a first top clamping member, and a second top clamping member having a top clamping portion and a top securing portion. In some embodiments, the top clamping portion of the second top clamping member is engaged with the first top clamping member to clamp the top end of the mirror therebetween, and the top securing portion of the second top clamping member is coupled to the second portion of the top bearing shaft. In some embodiments, the top clamp structure may further include a liner member disposed between the first top clamping member and the top end of the mirror, and a hardness of the liner member is less than a hardness of the mirror.

In some embodiments, the galvo mirror assembly may further include a sensor board support plate coupled to the top enclosure; a sensor board coupled to the sensor board support plate, where the sensor board may include a socket to mount a sensor; and a magnetic member coupled to the first portion of the top bearing shaft and rotatable around the axis. The sensor is configured to detect a rotation angle of the magnetic member. In some embodiments, the galvo mirror assembly may further include a top cover coupled to the top enclosure, and the top cover may include a hole through which a portion of the sensor board protrudes.

In some embodiments of the galvo mirror assembly, the bottom bracket may include a bottom enclosure having a bottom central hole. In some embodiments, the second rotatable unit may include a bottom bearing having an inner rail and an outer rail, where the outer rail is coupled to the bottom central hole; a bottom bearing shaft having a third portion and a fourth portion, where the third portion of the bottom bearing shaft is in the bottom bearing and is rotatable around the axis; and a bottom clamp structure having a first bottom portion and a second bottom portion. The first bottom portion of the bottom clamp structure is coupled to the bottom end of the mirror, and the second bottom portion of the bottom clamp structure is coupled to the third portion of the bottom bearing shaft. In some embodiments, the enhance plate is coupled to the bottom enclosure. In some embodiments, the galvo mirror assembly may further include a bottom cover coupled to the bottom enclosure.

In some embodiments of the galvo mirror assembly, the bottom bearing shaft may include a fifth hole opened at the third portion thereof, and the second bottom portion of the bottom clamp structure is in the fifth hole. In some embodiments, the bottom bearing shaft may include two second slots disposed diametrically around the fifth hole and extending along the axis, and the second bottom portion of the bottom clamp structure may include two second keys disposed diametrically and each inserted in a respective one of the two second slots.

In some embodiments of the galvo mirror assembly, the bottom bearing shaft may include a shoulder disposed around an outer circumferential surface of the third portion of the bottom bearing shaft, and the shoulder of the bottom bearing shaft pushes against the inner rail of the bottom bearing.

In some embodiments of the galvo mirror assembly, the bottom bracket may further include a second fastener, and the bottom bearing shaft may include a sixth hole extending along the axis. In some embodiments, the bottom clamp structure may include a seventh hole extending along the axis, and the second fastener couples the bottom clamp structure to the bottom bearing shaft through the sixth hole and the seventh hole.

In some embodiments, the galvo mirror assembly may include a driven magnetic member having a first driven portion and a second driven portion, where the first driven portion of the driven magnetic member is engaged with the fourth portion of the bottom bearing shaft; and a driving coil disposed around the second driven portion of the driven magnetic member within the bottom enclosure.

In some embodiments of the galvo mirror assembly, the bottom clamp structure may include a first bottom clamping member; and a second bottom clamping member having a bottom clamping portion and a bottom securing portion. In some embodiments, the bottom clamping portion of the second bottom clamping member is engaged with the first bottom clamping member to clamp the bottom end of the mirror therebetween, and the bottom securing portion of the second bottom clamping member is coupled to the third portion of the bottom bearing shaft. In some embodiments, the bottom clamp structure may further include a liner member disposed between the first bottom clamping member and the bottom end of the mirror, and a hardness of the liner member is less than a hardness of the mirror.

Techniques disclosed herein offer various improvements and advantages over existing techniques. For example, a galvo assembly according to some embodiments may provide structural stability and duration to prevent, or at least mitigate, mirrors in the galvo assembly from breaking or damaging due to pivoting of the mirrors in the galvo assembly. The structural design of the galvo assembly according to some embodiments may also improve alignment of components of the galvo assembly to improve the accuracy of light steering operation.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Aspects and features of the various embodiments will be more apparent by describing examples with reference to the accompanying drawings, in which like reference numerals refer to like components or parts throughout the drawings.

FIG. 7A is a perspective view illustrating the part of the top bracket, and FIG. 7B is a perspective and cross-sectional view illustrating the part of the top bracket.

FIG. 10A is a perspective view illustrating the bottom bracket, and FIG. 10B is a perspective and cross-sectional view illustrating the bottom bracket.

FIG. 12B illustrates a cross section of the part of the galvo assembly in FIG. 12A to further illustrate internal structures.

DETAILED DESCRIPTION OF THE INVENTION

Figure 1:
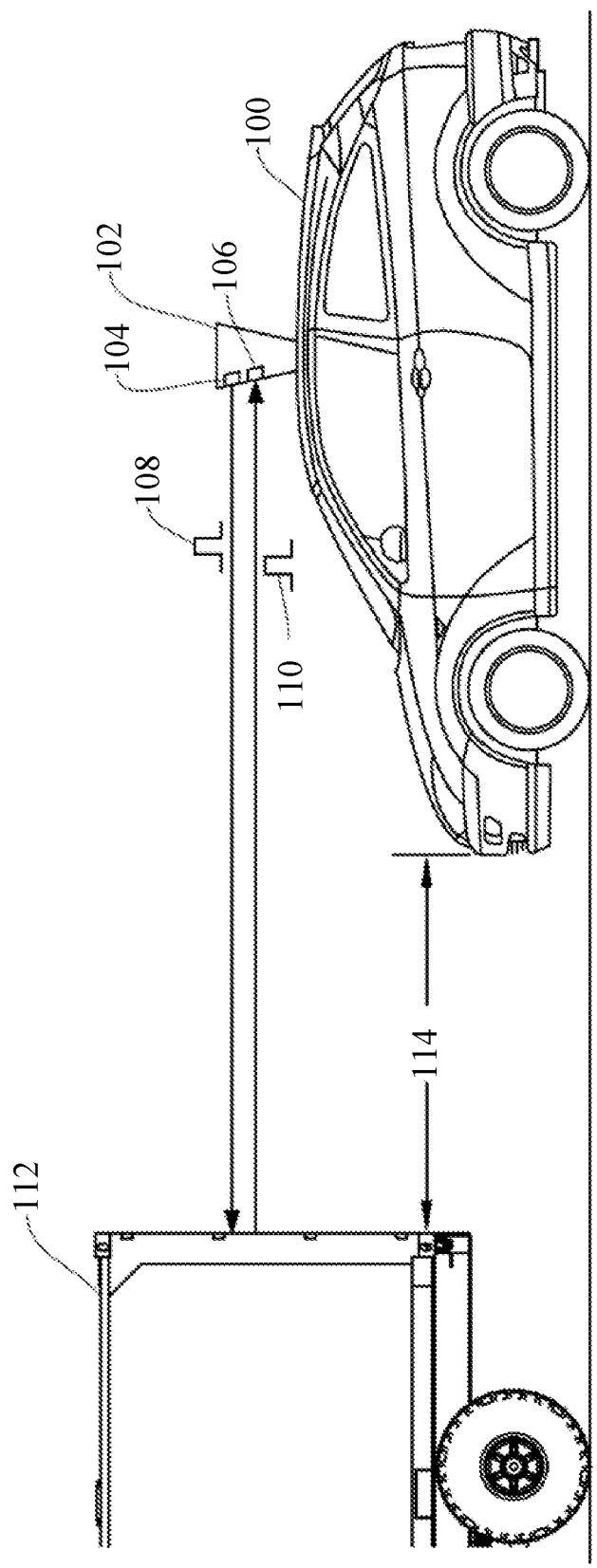
FIG. 1 illustrates an example of a vehicle including a LiDAR-based detection system according to certain embodiments.

Techniques disclosed herein relate generally to light detection and ranging (LiDAR) systems, and more specifically, to techniques for improving structural stability and duration of light beam steering components in a LiDAR system. In particular, techniques disclosed herein relate to a galvanometer (galvo) assembly with a stable and durable structure for steering light beam incident thereon in a compact LiDAR system that has limited space. Various inventive embodiments are described herein, including devices, units, subsystems, modules, systems, methods, and the like.

In some LiDAR systems, light deflectors may be implemented using a galvo assembly which usually comprises a mirror mounted on a holder that may be rotated. In the operation of such LiDAR systems, the galvo assembly provides torque through the holder to the mirror to rotate the mirror around a rotation axis so as to deflect a light beam incident on the mirror to different directions. In some galvo assembles, the holder clamps one end of the mirror and the other end of the mirror is unrestricted. For example, in some galvo assemblies, the mirror is vertically arranged. To preserve the functional surface of the mirror to the maximum size, the holder may clamp less than 1/10 of the mirror at its bottom end, while the top end of the mirror is free of restriction. In the operation of the LiDAR system, continuous torque for rotating the mirror in the gavlo assembly may create stress concentration near regions of the mirror clamped by the holder. In addition, the vibration, the acceleration, and the deceleration of the vehicle on which the LiDAR system is mounted may cause the swing of the top end of the mirror with respect to the clamped bottom end of the mirror, which may not only affect the performance (e.g., scanning accuracy) of the LiDAR system but also greatly increase the stress near the regions of the mirror clamped by the holder. The stress concentration may cause breaking or damaging of the mirror near the regions of the mirror clamped by the holder. Thus, the structure of the galvo assembly needs to be improved to prevent, or at least mitigate, breaking or damaging of the mirror.

Certain embodiments disclosed herein provide an improved galvo assembly to address the above-described problems. In one example, a gavlo assembly includes a mirror having a top end and a bottom end, a top bracket including a first rotatable unit configured to rotate around an axis, and a bottom bracket aligned with the top bracket and including a second rotatable unit configured to rotate around the axis. The top end of the mirror is coupled to the first rotatable unit of the top bracket and the bottom end of the mirror is coupled to the second rotatable unit of the bottom bracket, such that the mirror is rotatable around the axis. The gavlo assembly further includes an enhance plate extending between and non-rotatably coupled to the top bracket and the bottom bracket, where the enhance plate is spaced apart from the mirror and does not rotate with the mirror.

The gavlo assembly according to certain embodiments provides a rotatable support that clamps both the top end and the bottom end of the mirror, which may at least mitigate the stress concentration near regions of the mirror clamped by the top and bottom brackets. Furthermore, the enhance plate provides a structure stiffness to the galvo assembly and reduces or prevents the swing of the top end of the mirror with respect to the bottom end of the mirror, and thus can further reduce the stress in the mirror and the interference with the operation of the mirror of the galvo assembly caused by the vibration, acceleration, and deceleration of the vehicle.

The top and bottom brackets provide additional design advantages for the galvo assembly over the conventional approaches. For example, the holder of some conventional galvo assembly is arranged at one end of the mirror, and the holder encloses driving circuits (e.g., driving coils and magnets) and detecting circuits (e.g., sensors and magnets) of the gavlo assembly, both of which usually include magnetic members. Thus, the driving circuits and detecting circuits may interfere with each other. The gavlo assembly according to certain embodiments includes the top bracket and the bottom bracket, thus allowing separation of the driving circuits and the detecting circuits. For example, the galvo assembly according to certain embodiments may have the driving circuits arranged in the bottom bracket, and have the detecting circuits arranged in the top bracket, so as to prevent, or at least mitigate, the magnetic interference between the driving circuits and the detecting circuits. Alternatively, the galvo assembly according to certain embodiments may have the driving circuits arranged in the top bracket, and have the detecting circuits arranged in the bottom bracket.

In the following description, for the purposes of explanation, specific details are set forth in order to provide a thorough understanding of examples of the disclosure. It will be apparent that various examples may be practiced without these specific details. The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile applications, desktop applications, web applications, enterprise applications, and the like. Further, the teachings of this disclosure are not restricted to a particular operating environment (e.g., operating systems, devices, platforms, and the like), but instead can be applied to multiple different operating environments.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

The word "example" or "exemplary" is used herein to mean "serving as an example, instance, or illustration." Any embodiment or design described herein as "exemplary" or "example" is not necessarily to be construed as preferred or advantageous over other embodiments or designs.

A LiDAR system is an active remote sensing system that can be used to obtain the range from a transmitter to one or more points on a target in a field of view. A LiDAR system uses a light beam, typically a laser beam, to illuminate the one or more points on the target. Compared with other light sources, a laser beam may propagate over long distances without spreading significantly (highly collimated), and can be focused to small spots so as to deliver high optical power densities and provide fine resolution. The laser beam may be modulated such that the transmitted laser beam may include a series of pulses. The transmitted laser beam may be directed to a point on the target, which may reflect or scatter the transmitted laser beam. The laser beam reflected or scattered from the point on the target to the LiDAR system can be measured, and the time of flight (ToF) from the time a pulse of the transmitted light beam is transmitted from the transmitter to the time the pulse arrives at a receiver near the transmitter or at a known location may be measured. The range from the transmitter to the point on the target may then be determined by, for example, $r=c \times t/2$, where r is the range from the transmitter to the point on the target, c is the speed of light in free space, and t is the ToF of the pulse of the light beam from the transmitter to the receiver.

A LiDAR system may include, for example, a single-point scanning system or a single-pulse flash system. A single-point scanning system may use a scanner to direct a pulsed light beam (e.g., pulsed laser beam) to a single point in the field of view at a time and measure the reflected or backscattered light beam with a photodetector. The scanner may then slightly tilt the pulsed light beam to illuminate the next point, and the process may be repeated to scan the full field of view. A flash LiDAR system, on the other hand, may transmit a wider-spread light beam and use a two dimensional array of photodiodes (e.g., a focal-plane array (FPA)) to measure the reflected or backscattered light at several points simultaneously. Due to the wider beam spread, a flash LiDAR system may scan a field of view faster than a single-point scanning system, but may need a much more powerful light source to illuminate a larger area.

FIG. 1 illustrates an example of a vehicle 100 including a LiDAR-based detection system according to certain embodiments. Vehicle 100 may include a LiDAR system 102. LiDAR system 102 may allow vehicle 100 to perform object detection and ranging in the surrounding environment. Based on the result of the object detection and ranging, vehicle 100 may, for example, automatically maneuver (with little or no human intervention) to avoid a collision with an object in the environment. LiDAR system 102 may include a transmitter 104 and a receiver 106.

Transmitter 104 may direct one or more light pulses 108 (or a frequency modulated continuous wave (FMCW) light signal, an amplitude modulated continuous wave (AMCW) light signal, etc.), at various directions at different times according to a suitable scanning pattern, while receiver 106 may detect returned light pulses 110 which may be portions of transmitted light pulses 108 that are reflected or scattered by one or more areas on one or more objects. LiDAR system 102 may detect the object based on the detected light pulses 110, and may also determine a range (e.g., a distance) of each area on the detected objects based on a time difference between the transmission of a light pulse 108 and the reception of a corresponding light pulse 110, which is referred to as the time of flight. Each area on a detected object may be represented by a data point that is associated with a 2-D or 3-D direction and distance with respect to LiDAR system 102.

The above-described operations can be repeated rapidly for many different directions. For example, the light pulses can be scanned using various scanning mechanisms (e.g., spinning mirrors or MEMS devices) according to a one-dimensional or two-dimensional scan pattern for two-dimensional or three-dimensional detection and ranging. The collection of the data points in the 2-D or 3-D space may form a "point cloud," which may indicate, for example, the direction, distance, shape, and dimensions of a detected object relative to the LiDAR system.

In the example shown in FIG. 1, LiDAR system 102 may transmit light pulse 108 in a direction directly in front of vehicle 100 at time T1 and receive a returned light pulse 110 that is reflected by an object 112 (e.g., another vehicle) at time T2. Based on the detection of light pulse 110, LiDAR system 102 may determine that object 112 is directly in front of vehicle 100. In addition, based on the time difference between T1 and T2, LiDAR system 102 may determine a distance 114 between vehicle 100 and object 112. LiDAR system 102 may also determine other useful information, such as a relative speed and/or acceleration between two vehicles and/or the dimensions of the detected object (e.g., the width or height of the object), based on additional light pulses detected. As such, vehicle 100 may be able to adjust its speed (e.g., slowing down, accelerating, or stopping) to avoid collision with other objects, or may be able to control other systems (e.g., adaptive cruise control, emergency brake assist, anti-lock braking systems, or the like) based on the detection and ranging of objects by LiDAR system 102.

Figure 2A:
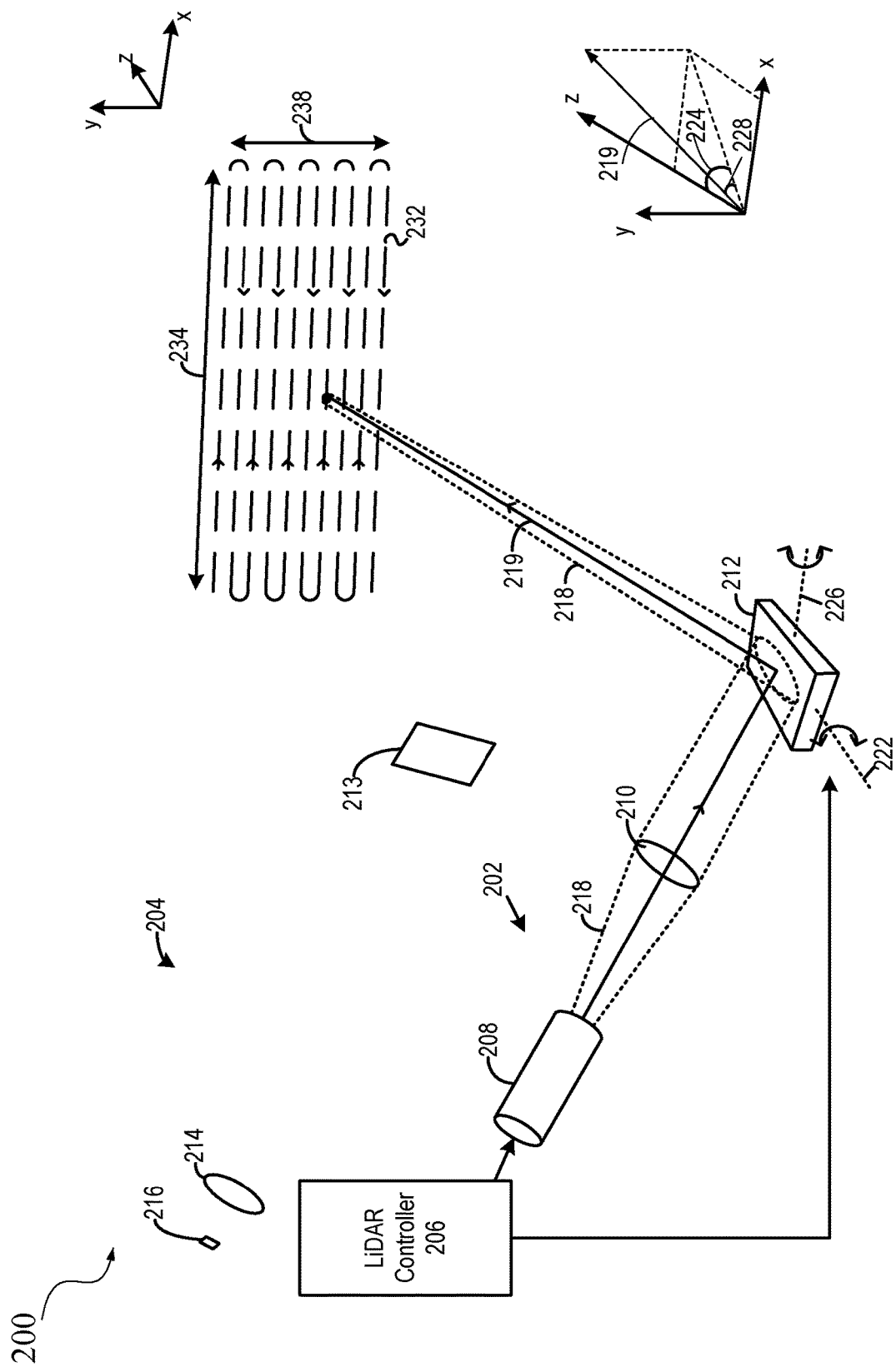
FIG. 2A and FIG. 2B illustrate simplified block diagrams of an example of a LiDAR module according to certain embodiments.
Figure 2B:
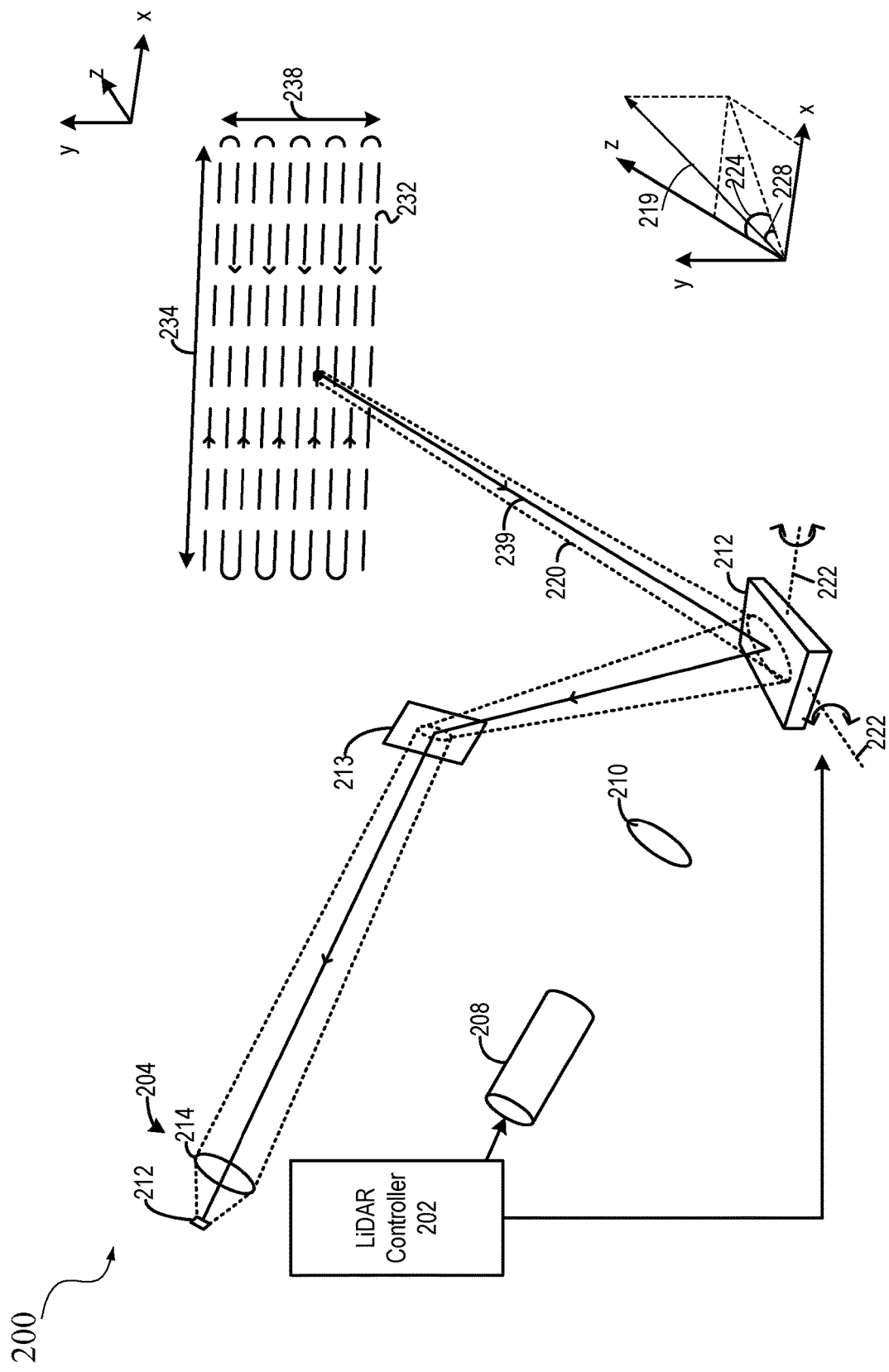

FIG. 2A and FIG. 2B illustrate simplified block diagrams of an example of a LiDAR module 200 according to certain embodiments. LiDAR module 200 may be an example of LiDAR system 102, and may include a transmitter 202, a receiver 204, and a LiDAR controller 206 that controls the operations of transmitter 202 and receiver 204. Transmitter 202 may include a light source 208 and a collimator lens 210, whereas receiver 204 may include a lens 214 and a photodetector 216. LiDAR module 200 may further include a mirror assembly 212 and a beam deflector 213. In some embodiments, transmitter 202 and receiver 204 may be configured to share mirror assembly 212 to perform light steering and detecting operation, with beam deflector 213 configured to reflect incident light reflected by mirror assembly 212 to receiver 204. In some embodiments, beam deflector 213 may be shared by transmitter 202 and receiver 204, where light from light source 208 and reflected by mirror assembly 212 may be further reflected by beam deflector 213, while the returned beam may be deflected by beam deflector 213 to lens 214 and photodetector 216.

FIG. 2A illustrates an example of a beam steering operation by LiDAR module 200. To project light, LiDAR controller 206 can control light source 208 to transmit a light beam 218 (e.g., light pulses 108, an FMCW light signal, an AMCW light signal, etc.). Light beam 218 may diverge upon leaving light source 208 and may be collimated by collimator lens 210. Collimated light beam 218 may propagate with substantially the same beam size.

Collimated light beam 218 may be incident upon mirror assembly 212, which can reflect and steer the light beam along an output projection path 219 towards a field of interest, such as object 112. Mirror assembly 212 may include one or more rotatable mirrors, such as a one-dimensional or two-dimensional array of micro-mirrors. Mirror assembly 212 may also include one or more actuators (not shown in FIG. 2A) to rotate the rotatable mirrors. The actuators may rotate the rotatable mirrors around a first axis 222, and/or may rotate the rotatable mirrors around a second axis 226. The rotation around first axis 222 may change a first angle 224 (e.g., longitude angle) of output projection path 219 with respect to a first dimension (e.g., the x-axis), whereas the rotation around second axis 226 may change a second angle 228 (e.g., altitude angle) of output projection path 219 with respect to a second dimension (e.g., the y-axis). LiDAR controller 206 may control the actuators to produce different combinations of angles of rotation around first axis 222 and second axis 226 such that the movement of output projection path 219 can follow a scanning pattern 232. A range 234 of movement of output projection path 219 along the x-axis, as well as a range 238 of movement of output projection path 219 along the y-axis, can define a FOV. An object within the FOV, such as object 112, can receive and reflect collimated light beam 218 to form reflected or returned light signal, which can be received by receiver 204.

FIG. 2B illustrates an example of a return beam detection operation by LiDAR module 200. LiDAR controller 206 can select an incident light direction 239 for detection of incident light by receiver 204. The selection can be based on setting the angles of rotation of the rotatable mirrors of mirror assembly 212, such that only light beam 220 propagating along light direction 239 gets reflected to beam deflector 213, which can then divert light beam 220 to photodetector 216 via collimator lens 214. Photodetector 216 may include any suitable high-speed detector that can detect light pulses in the working wavelength of the LiDAR system, such as a PIN photodiode, a silicon photomultiplier (SiPM) sensor, or an InGaAs avalanche photodetector. With such arrangements, receiver 204 can selectively receive signals that are relevant for the ranging/imaging of a target object, such as light pulse 110 generated by the reflection of collimated light beam 218 by object 112, and not to receive other signals. As a result, the effect of environment disturbance on the ranging/imaging of the object can be reduced, and the system performance can be improved.

Figure 3A:
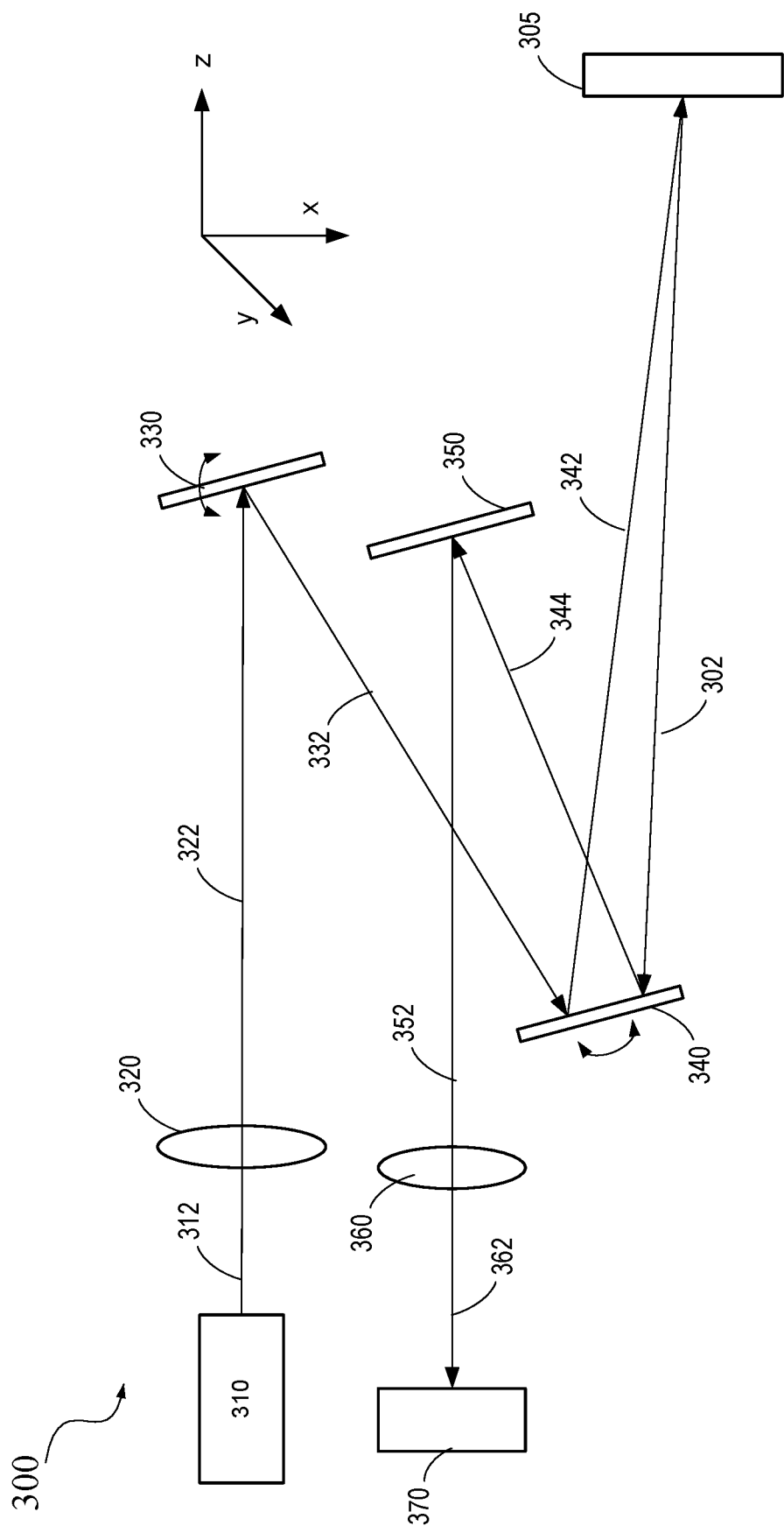
FIG. 3A is a simplified block diagram of an example of an optical subsystem in a LiDAR system, such as LiDAR system shown in FIG. 1, according to certain embodiments.

FIG. 3A is a simplified block diagram of an example of an optical subsystem 300 in a LiDAR system, such as LiDAR system 102 shown in FIG. 1, according to certain embodiments. In some embodiments, a plurality of optical subsystems 300 can be integrated into the LiDAR system to achieve, for example, 360° coverage in the transverse plane. In one example, a LiDAR system may include eight optical subsystems 300 distributed around a circle, where each optical subsystem 300 may have a field of view about 45° in the transverse plane.

In the example shown in FIG. 3A, optical subsystem 300 may include a light source 310, such as a laser (e.g., a pulsed laser diode). A light beam 312 emitted by light source 310 may be collimated by a collimation lens 320. The collimated light beam 322 may be incident on a first deflector 330, which may be stationary or may rotate in at least one dimension such that collimated light beam 322 may at least be deflected by first deflector 330 towards, for example, different y locations. Collimated light beam 332 deflected by first deflector 330 may be further deflected by a second deflector 340, which may be stationary or may rotate in at least one dimension. For example, second deflector 340 may rotate and deflect collimated light beam 332 towards different x locations. Collimated light beam 342 deflected by second deflector 340 may reach a target point at a desired (x, y) location on a target object 305. As such, first deflector 330 and second deflector 340 may, alone or in combination, scan the collimated light beam in two dimensions to different (x, y) locations in a far field.

Target object 305 may reflect collimated light beam 342 by specular reflection or diffuse reflection. At least a portion of the reflected light 302 may reach second deflector 340 and may be deflected by second deflector 340 as a light beam 344 towards a third deflector 350. Third deflector 350 may deflect light beam 344 as a light beam 352 towards a receiver, which may include a lens 360 and a photodetector 370. Lens 360 may focus light beam 352 as a light beam 362 onto a location on photodetector 370, which may include a single photodetector or an array of photodetectors. Photodetector 370 may be any suitable high-speed detector that can detect light pulses in the working wavelength of the LiDAR system, such as a PIN photodiode, a silicon photomultiplier (SiPM) sensor, or an InGaAs avalanche photodetector. In some embodiments, one or more other deflectors may be used in the optical path to change the propagation direction of the light beam (e.g., fold the light beam) such that the size of optical subsystem 300 may be reduced or minimized without impacting the performance of the LiDAR system. For example, in some embodiments, a fourth deflector may be placed between third deflector 350 and lens 360, such that lens 360 and photodetector 370 may be placed in desired locations in optical subsystem 300.

The light deflectors described above may be implemented using, for example, a micro-mirror array, a galvo mirror, a stationary mirror, a grating, or the like. In one example implementation, first deflector 330 may include a micro-mirror array, second deflector 340 may include a galvo mirror, and third deflector 350 and other deflectors may include stationary mirrors. A micro-mirror array can have an array of micro-mirror assemblies, with each micro-mirror assembly having a movable micro-mirror and an actuator (or multiple actuators). The micro-mirrors and actuators can be formed as a microelectromechanical system (MEMS) on a semiconductor substrate, which may allow the integration of the MEMS with other circuitries (e.g., controller, interface circuits, etc.) on the semiconductor substrate.

In some LiDAR systems, light deflectors may be implemented using a galvo assembly which usually comprises a mirror mounted on a holder that may be rotated. In the operation of such LiDAR systems, the galvo assembly provides torque through the holder to the mirror to rotate the mirror around a rotation axis so as to deflect a light beam incident on the mirror. The continuous torque for rotating the mirror in the gavlo assembly may create stress concentration at the connection between the mirror and the holder. In addition, the vibration, the acceleration, and the deceleration of the vehicle on which the LiDAR system is mounted may also create stress concentration at the connection between the mirror and the holder. These stress concentration may cause breaking or damaging of the mirror. Thus, the structure of the galvo assembly needs to be improved to prevent, or at least mitigate, breaking or damaging of the mirror.

Figure 3B:
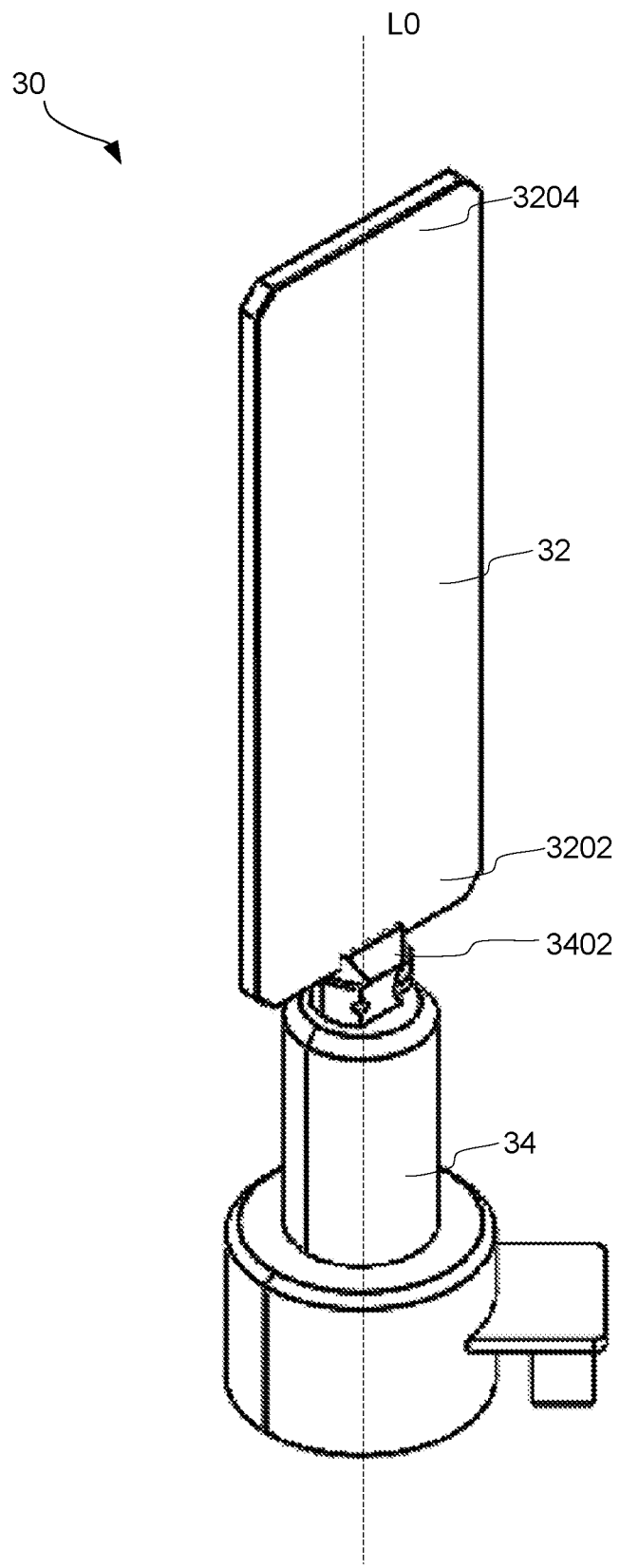
FIG. 3B is a perspective view illustrating a galvo assembly.

FIG. 3B is a perspective view illustrating a galvo assembly 30. Galvo assembly 30 may be used to implement first deflector 330 or second deflector 340 shown in FIG. 3A. Galvo assembly 30 includes a mirror 32 having a top end 3204 and a bottom end 3202, and a holder 34 having a top end 3402. Bottom end 3202 of mirror 32 is clamped by top end 3402 of holder 34. The driving circuits (not shown) and detecting circuits (not shown) of galvo assembly 30 are housed in holder 34. In operation of galvo assembly 30, mirror 32 together with top end 3402 of holder 34 may rotate around rotation axis L0. Usually, the rotation of mirror 32 is limited to a predetermined range of degrees, such as from about −30° to about +30°. Here, −30° means the rotation of 30° from a neutral position in the clockwise direction viewed along rotation axis L0 from top end 3204 of mirror 32, and +30° means the rotation of 30° from a neutral position in the counter clockwise direction viewed along rotation axis L0 from top end 3204 of mirror 32, or vice versa. As shown in FIG. 3B, the connection between bottom end 3202 of mirror 32 and top end 3404 of holder 34 occupies a relatively small portion of mirror 32 to preserve the functional surface of mirror 32 to the maximum size. Due to, for example, the vibration, the acceleration, and the deceleration of the vehicle on which the LiDAR system is mounted, top end 3204 of mirror 32 may swing with respect to bottom end 3202 of mirror 32 that is clamped by top end 3404 of holder 34. Thus, stress may concentrate at the connection region to cause breaking or cracking of mirror 32. In addition, the swing of top end 3204 of mirror 32 with respect to bottom end 3202 of mirror 32 may change the propagation direction of the laser beam deflected by mirror 32. Furthermore, the driving circuits and the detecting circuits of galvo assemble 30 may interfere with each other because they are both housed in the holder 34.

Figure 4:
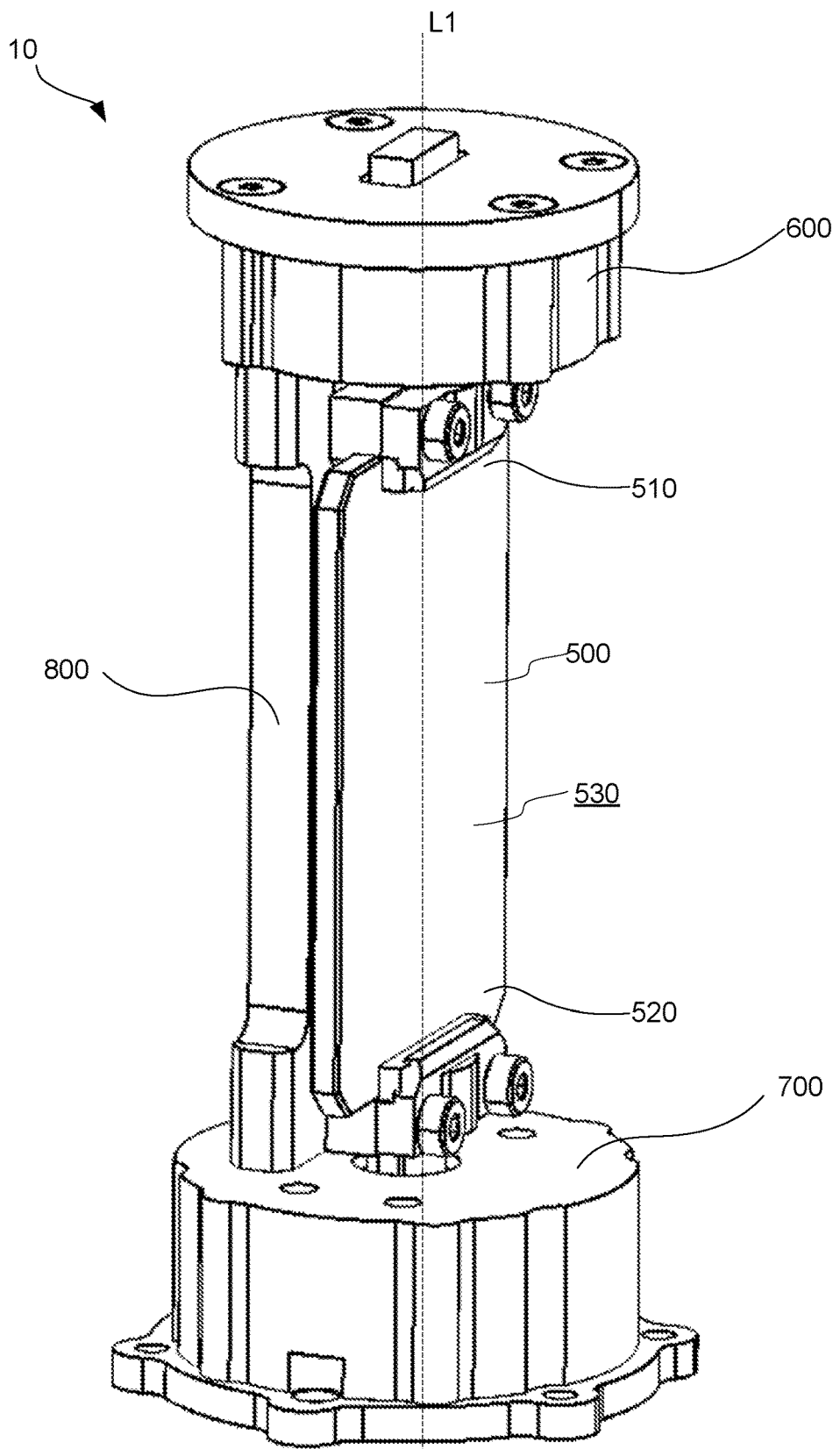
FIG. 4 is a perspective view illustrating a galvo assembly according to certain embodiments.

FIG. 4 is a perspective view illustrating a galvo assembly 10 according to certain embodiments. Galvo assembly 10 may be an example of second deflector 340. Gavlo assembly 10 may include a mirror 500 disposed to rotate around a rotation axis L1. In some embodiments, the rotation axis L1 is aligned in a vertical direction. Mirror 500 may include a top end 510 and a bottom end 520. In some embodiments, mirror 500 may include an optical surface 530 and a back surface (not shown) opposite optical surface 530. In another embodiment, mirror 500 may include two optical surfaces disposed opposite each other. Gavlo assembly 10 may further include a top bracket 600 secured to top end 510 of mirror 500, and a bottom bracket 700 secured to bottom end 520 of mirror 500. In one embodiment, gavlo assembly 10 may further include an enhance plate 800 connected between top bracket 600 and bottom bracket 700. In some embodiments, enhance plate 800 may extend along the back surface of mirror 500 and is spaced from the back surface. Enhance plate 800 provides stiffness to gavlo assembly 10. When mirror 500 rotates around rotation axis L1 in operation, top bracket 600, bottom bracket 700 and enhance plate 800 prevent, or at least mitigate, stress concentration at top end 510 and/or bottom end 520 of mirror 500, hence prevent, or at least mitigate, mirror 500 from cracking or breaking. The details of galvo assembly 10 will be described below with reference to the subsequent figures. One skilled in the art should understand the drawings are simplified for clarity of description, and the drawings may be exaggerated and may not be drawn to scale.

Figure 5:
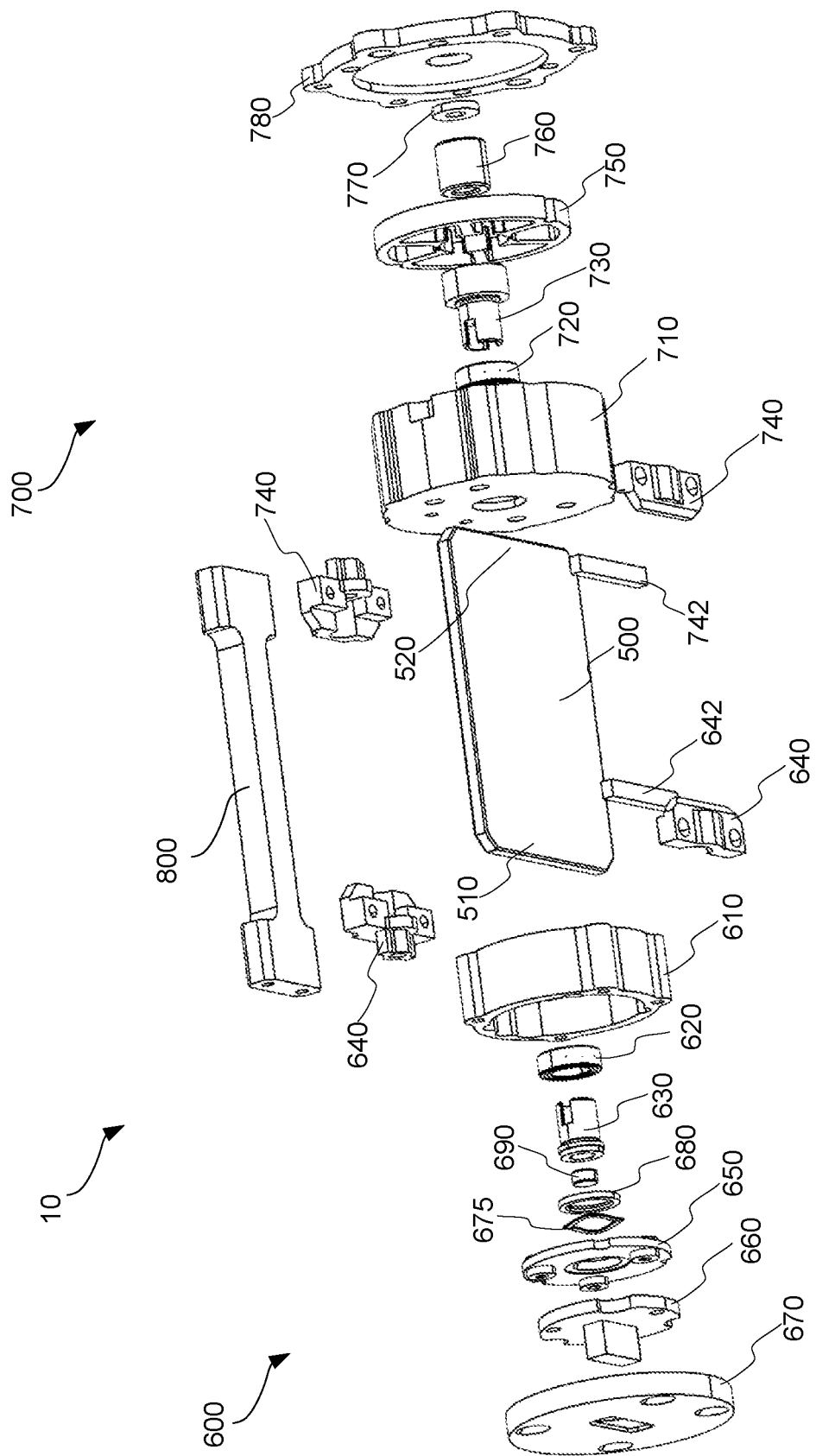
FIG. 5 is an exploded perspective view illustrating structural details of a gavlo assembly according to certain embodiments.

FIG. 5 is an exploded perspective view illustrating the structural details of gavlo assembly 10 according to certain embodiments. It should be noted, some fasteners of galvo assembly 10 may not be shown for sake of clarity. As shown in FIG. 5, gavlo assembly 10 may include mirror 500, top bracket 600, bottom bracket 700 and enhance plate 800.

As shown in FIG. 5, in one embodiment, top bracket 600 may include a top enclosure 610, a top bearing 620, a top bearing shaft 630 inserted in top bearing 620, a top clamp structure 640 secured to top end 510 of mirror 500, a sensor board support plate 650 seated in top enclosure 610, a sensor board 660 secured to sensor board support plate 650 and seated in top enclosure 610, a top cover 670 secured to top enclosure 610. Top bracket 600 may further include a leaf spring 675, a clamp ring 680, and a magnetic member 690. Top clamp structure 640 may further include a liner member 642 disposed between top clamp structure and top end 510 of mirror 500 in assembled gavlo assembly 10. The structure details and engagement relations among components of top bracket 600 will be described below. It should be noted, top bracket 600 may further included multiple fasteners to secure the above mentioned elements together, which are not shown in FIG. 5 for clarity.

As shown in FIG. 5, bottom bracket 700 may include a bottom enclosure 710, a bottom bearing 720 seated in bottom enclosure 710, a bottom bearing shaft 730 inserted in bottom bearing 720, a bottom clamp structure 740 clamping bottom end 520 of mirror 500, a driving coil 750 seated in bottom enclosure 710, a driven magnetic member 760 surrounded by driving coil 750, a gasket 770 and a bottom cover 780 secured to bottom enclosure 710. Bottom clamp structure 740 may further include a liner member 742 disposed between bottom clamp structure 740 and bottom end 520 of mirror 500 in assembled galvo assembly 10. It should be noted that bottom bracket 700 may further include multiple fasteners to secure the above mentioned elements together, which are not shown in FIG. 5 for clarity.

Figure 6:
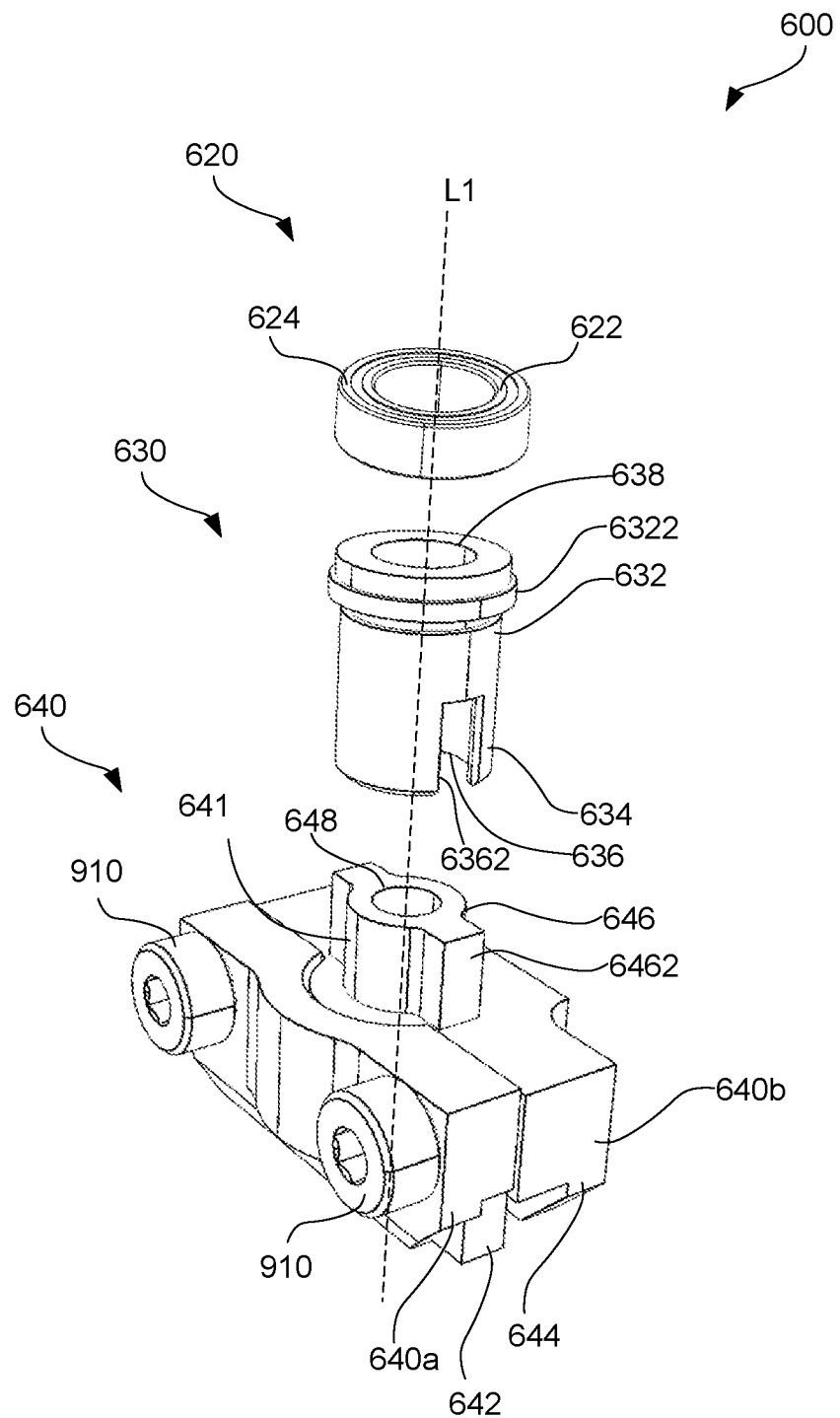
FIG. 6 is a perspective view illustrating a part of a top bracket according to certain embodiments.

FIG. 6 is an exploded perspective view illustrating a part of top bracket 600 according to certain embodiments. Specifically, FIG. 6 shows top bearing 620, top bearing shaft 630 and top clamp structure 640. As shown in FIG. 6, top bearing 620 may include an inner rail 622 and an outer rail 624. In the assembled state, a central axis of top bearing 620 is aligned with the rotation axis L1 of galvo assembly 10.

As shown in FIG. 6, top bearing shaft 630 may include a first end 632 and a second end 634. In one embodiment, top bearing shaft 630 is secured at first end 632 within top bearing 620 and is rotatable around the rotation axis L1. In an assembled state, a longitudinal axis of top bearing shaft 630 is aligned with rotation axis L1 of gavlo assemble 10. A flange 6322 is disposed at first end 632 around an outer circumferential surface of top bearing shaft 630. In the assembly state, first end 632 of top bearing shaft 630 passes through inner rail 622 of top bearing 620 and is secured to the inner rail 622, with flange 6322 pushing against inner rail 622 of top bearing 620. In the assembled state, top bearing shaft 630 may rotate around rotation axis L1 of gavlo assembly 10. Top bearing shaft 630 may further include a hole 636 opened from second end 634 and extending at least a part of a length of top bearing shaft 630 along the longitudinal axis of top bearing shaft 630. In one embodiment, top bearing shaft 630 may further include two slots 6362 disposed diametrically around hole 636 and extending a predetermined length along the longitudinal axis of top bearing shaft 630. As shown in FIG. 6, top bearing shaft 630 may further include a hole 638 opened from first end 632 and extending a predetermined length along the longitudinal axis of top bearing shaft 630. In one embodiment, hole 638 is communicated with the hole 636. In one embodiment, hole 638 may have a different diameter from that of hole 636.

As shown in FIG. 6, top clamp structure 640 may include a first top clamping member 640a and a second top clamping member 640b having a first end 641 and a second end 644. In one embodiment, top clamp structure 640 is secured at first end 641 to second end 634 of top bearing shaft 630, and top clamp structure 640 is secured at second end 644 to the bottom end 520 of the mirror 500. First top clamping member 640a and second top clamping member 640b is secured together by fasteners 910 to clamp top end 510 of mirror 500 (shown in FIG. 5) between first top clamping member 640a and second end 644 of second top clamping member 640b. In one embodiment, top clamp structure 640 may further include liner member 642 that is disposed between first top clamping member 640a and top end 510 of mirror 500 (shown in FIG. 5). In one embodiment, liner member 642 may be made of appropriate materials (e.g., acrylic resin) having less hardness than that of mirror 500 to prevent damage to mirror 500 caused by the clamping effect of the top clamp structure 640.

As shown in FIG. 6, second top clamping member 640b may include an engaging portion 646 at first end 641. In one embodiment, engaging portion 646 is configured with a cylindrical shape to make engaging portion 646 insert into hole 636 of top bearing shaft 630. As shown in FIG. 6, engaging portion 646 may further include two keys 6462 disposed diametrically around the circumferential surface of engaging portion 646. In an assembled state, one key 6462 may insert in one slot 6362, while the other key 6462 may insert in the other slot 6362. Top clamp structure 640 may rotate around rotation axis L1 by virtue of the engagement of keys 6462 and slots 6362.

As shown in FIG. 6, second top clamping member 640b of top clamp structure 640 may further include a hole 648 opened from first end 641 and extending along rotation axis L1. In one embodiment, hole 648 is a through hole passing through first end 641 to second end 644 of second top clamping member 640b. In an assembled state, a fastener (not shown) may insert through hole 648 of top clamp structure 640 and hole 638 of top bearing shaft 630 to secure them together. In one embodiment, the fastener may include a screw having a threaded portion, and hole 638 is manufactured with corresponding thread to receive the threaded portion of the screw.

Figure 7A:
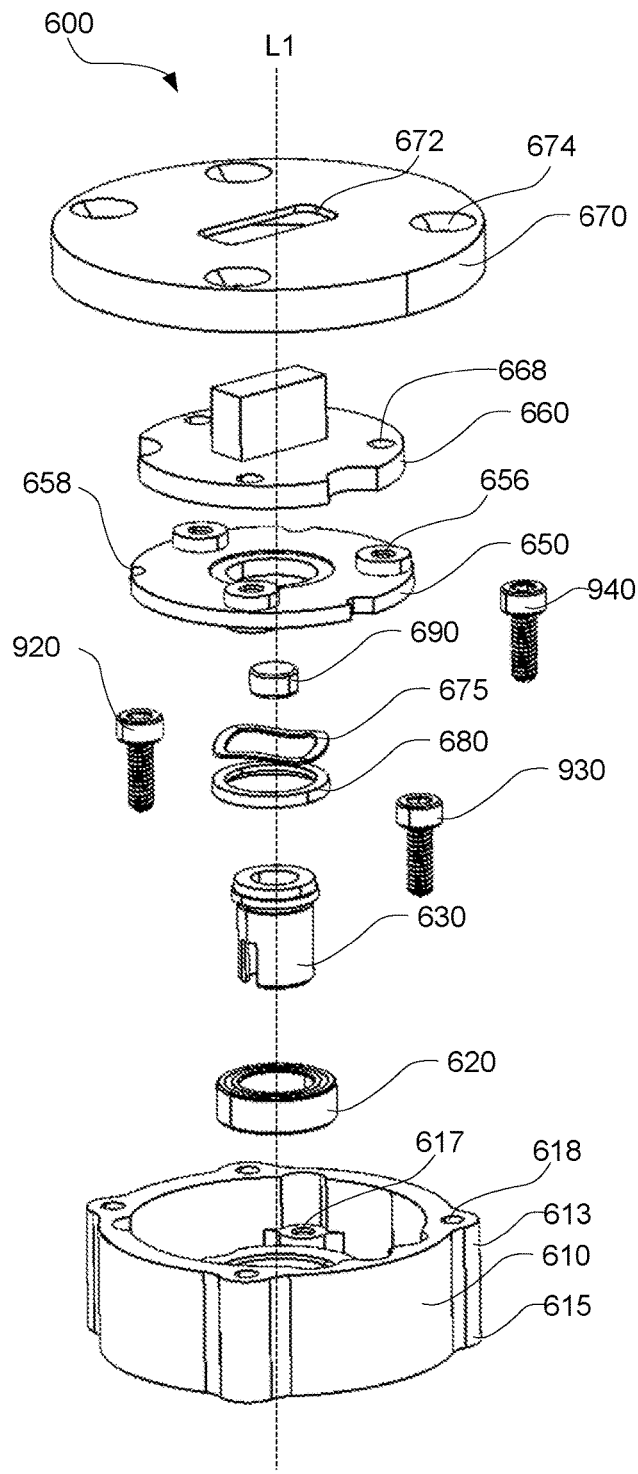
FIGS. 7A-7B illustrate a part of a top bracket according to certain embodiments, where
Figure 7B:
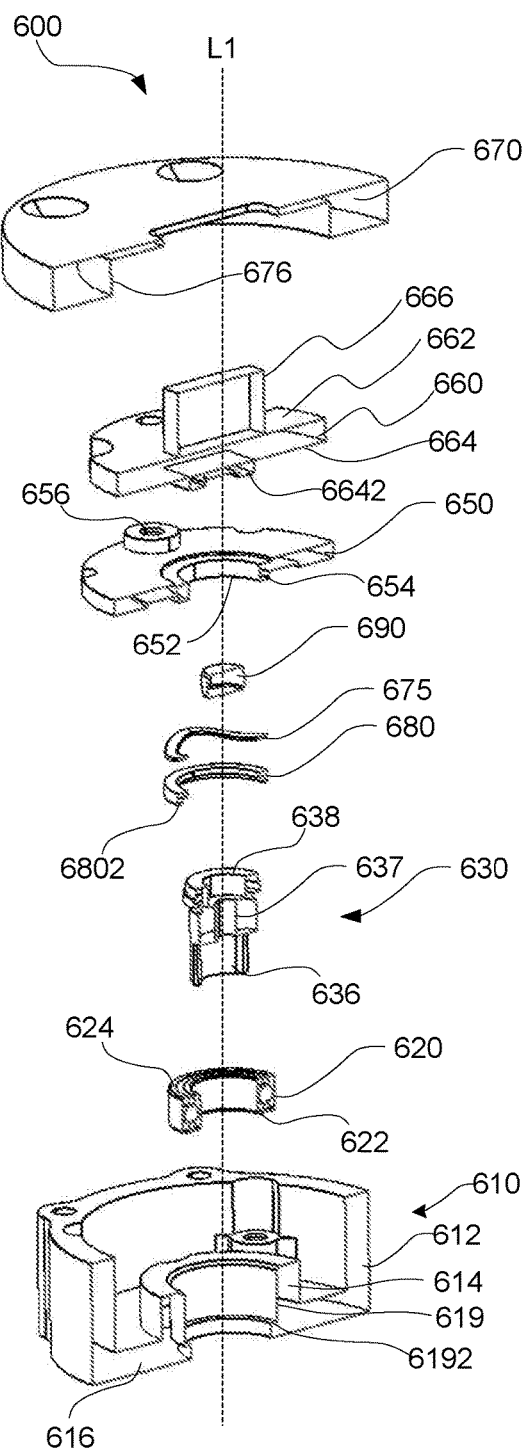

FIGS. 7A-7B illustrate a part of top bracket 600 according to certain embodiments. FIG. 7A is a perspective view illustrating the part of top bracket 600, and FIG. 7B is a perspective and cross-sectional view illustrating the part of top bracket 600. As shown in FIGS. 7A-7B, top bracket 600 may include top enclosure 610. In one embodiment, top enclosure 610 is configured to be two coaxial cylinders, including an outer wall 612 and an inner wall 614 with a central hole 619. Top enclosure 610 may include a first end 613 and a second end 615 closed by an end wall 616. Central hole 619 may include a flange 6192 at second end 615 of top enclosure 610. In an assembled state, top bearing 620 is seated in the central hole 619 with outer rail 624 pushing against flange 6192.

As shown in FIGS. 7A-7B, top bracket 600 may include top bearing shaft 630. In one embodiment, top bearing shaft 630 may include hole 638, hole 636, and a connecting hole 637 connecting hole 638 and hole 636.

As shown in FIGS. 7A-7B, top bracket 600 may include clamp ring 680. In one embodiment, clamp ring 680 is configured to have a flange 6802 protrude from a bottom surface of clamp ring 680. In an assembled state, clamp ring 680 is seated on top of top bearing 620, with flange 6802 pushing against outer rail 624 of top bearing 620. As shown in FIGS. 7A-7B, top bracket 600 may include a leaf spring 675. In one embodiment, leaf spring 675 is configured to be a ring shape. In an assembled state, leaf spring 675 is seated on top of clamp ring 680.

As shown in FIGS. 7A-7B, top bracket 600 may include sensor board support plate 650. In one embodiment, sensor board support plate is configured to be a disc shape. Sensor board support plate 650 may include a central hole 652 with a flange 654 protruding from a bottom surface of the sensor board support plate 650 and surrounding the central hole 652. Sensor board support plate 650 may include multiple holes 656 disposed circumferentially around a perimeter of sensor board support plate 650. As shown in FIG. 7A, Sensor board support plate 650 may further include multiple indents 658 disposed circumferentially around outer perimeter of sensor board support plate 650. In one embodiment, indents 658 may be used to secure sensor board support plate 650 with top enclosure 610 using a fastener 920.

As shown in FIGS. 7A-7B, top bracket 600 may include sensor board 660 on which a sensor (not shown) may be mounted to detect a rotation angle of mirror 500 (shown in FIG. 5). Sensor board 660 may include a top surface 662 and a bottom surface 664. A socket 6642 is disposed centrally on bottom surface 664. The sensor may be received in socket 6642 to make the normal direction of the sensor align with rotation axis L1. In one embodiment, the sensor may include a Hall sensor. Sensor board 660 may further include a lead support stud 666 passing through sensor board 660 and protruding from top surface 662. The lead support stud 666 may provide passage for wires used to communicate a detecting signal of the sensor.

As shown in FIG. 7A, sensor board 660 may include multiple holes 668 disposed circumferentially around a perimeter of sensor board 660. In an assembled state, a fastener 930 may insert through hole 668 in sensor board 660, hole 656 in sensor board support plate 650 in order to secure sensor board 660 to sensor board support plate 650. In one embodiment, fastener 930 may include a screw with a threaded portion, and hole 656 is manufactured with corresponding thread to receive the threaded portion of fastener 930.

As shown in FIGS. 7A-7B, top bracket 600 may include a magnetic member 690. Magnetic member 690 is secured in hole 638 of top bearing shaft 630 to make the sensor received in the socket 6642 on sensor board 660 face magnetic member 690 along rotation axis L1. In operation of galvo assembly 10, mirror 500 (shown in FIG. 5) rotates around rotation axis L1. Due to mechanical engagement between top clamp structure 640 (shown in FIG. 6) and top bearing shaft 630, top bearing shaft 630 together with magnetic member 690 rotate around rotation axis L1. The sensor received in the socket 6642 on sensor board 660 may detect a rotation angle of mirror 500 according to the change of magnetic flux of magnetic member 690 caused by the rotation.

As shown in FIGS. 7A-7B, top bracket 600 may further include top cover 670. Top cover 670 may include a hole 672 through top cover 670. In one embodiment, hole 672 provides a passage for lead support stud 666 of sensor board 660 to pass through top cover 670 to communicate detecting signal of the sensor mounted on sensor board 660 to other devices. In one embodiment, hole 672 is configured to conform to the cross section of lead support stud 666, such as a rectangular shape. Top cover 670 may include multiple holes 674 disposed substantially circumferentially. In an assembled state, a fastener 940 may insert through hole 674 in top cover 670 and hole 618 in top enclosure 610 in order to secure top cover 670 to top enclosure 610. In one embodiment, top cover 670 may include a recess 676 hollowed from a bottom surface of top cover 670 to provide additional accommodating room for components contained in top enclosure 610, such as the heads of fasteners 930 used to secure sensor board 660 to sensor board support plate 650.

Figure 8:
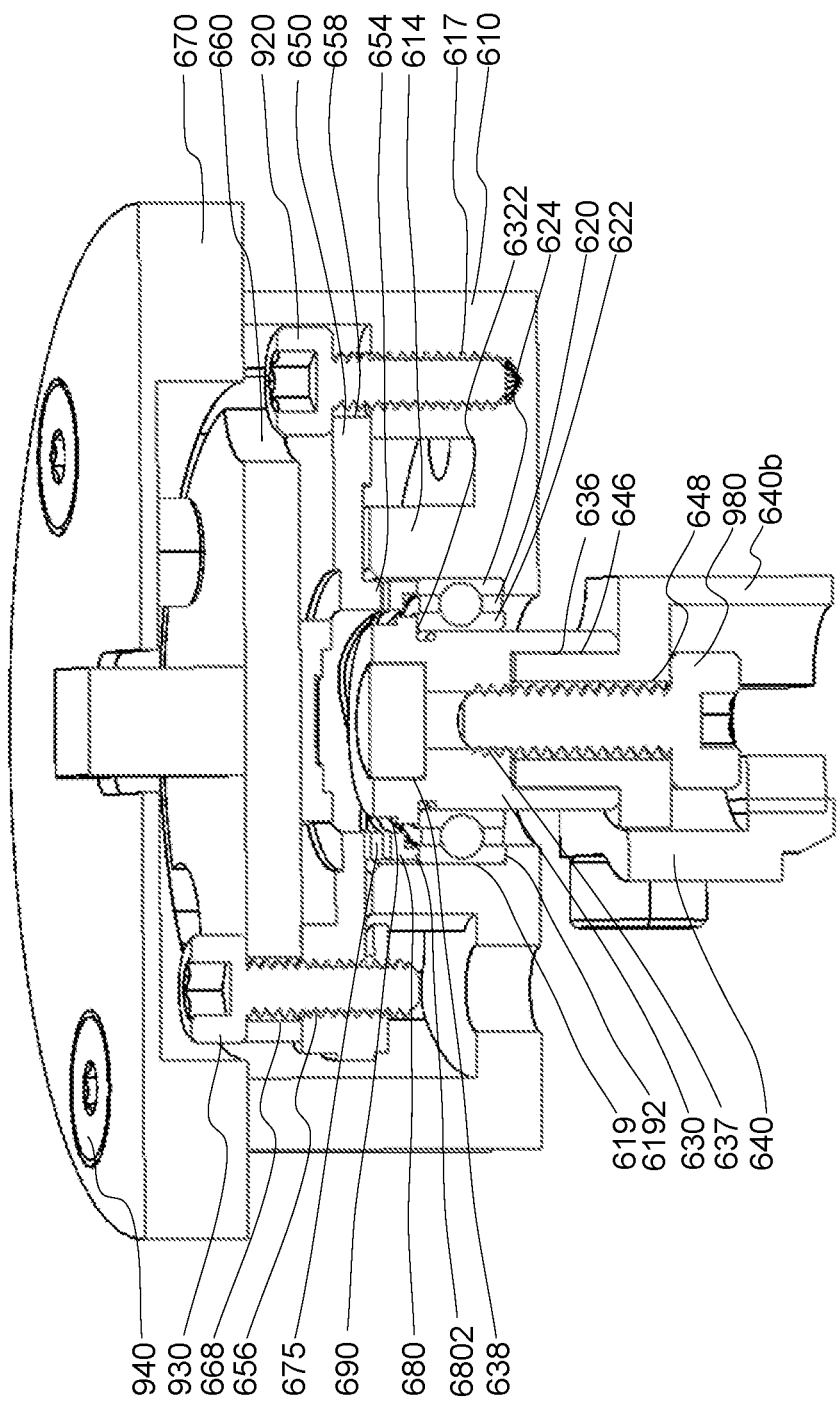
FIG. 8 is a perspective and cross-sectional view illustrating an assembled top bracket according to certain embodiments.

FIG. 8 is a perspective and cross-sectional view illustrating an assembled top bracket 600 according to certain embodiments. An example of assembly process will be described with reference to FIG. 8. As shown in FIG. 8, top bearing 620 is seated in the central hole 619 of top enclosure 610, with outer rail 624 pushing against flange 6192 of the central hole 619. Top bearing shaft 630 may insert from top side into top bearing 620, with the flange 6322 of top bearing shaft 630 pushing against inner rail 622 of top bearing 620. Engaging portion 646 of second top clamping member 640b of top clamp structure 640 may insert from bottom side into the hole 636 of top bearing shaft 630. A fastener 980 may insert from bottom side through hole 648 in second top clamping member 640b of top clamp structure 640 into connecting hole 637. In one embodiment, fastener 980 may include a screw with a threaded portion, and connecting hole 637 is manufactured with corresponding thread to receive the threaded portion of fastener 980 to make fastener 980 secure top clamp structure 640 to top bearing shaft 630.

Then, as shown in FIG. 8, clamp ring 680 is seated in the central hole 619 of top enclosure 610, with flange 6802 pushing against outer rail 624 of top bearing 620. Next, leaf spring 675 is seated on top of clamp ring 680. Sensor board support plate 650 is seated on top of inner wall 614 of top enclosure 610, with flange 654 of sensor board support plate 650 pushing against leaf spring 675. Then, fastener 920 may pass through indent 658 and insert into hole 617 in top enclosure 610, with the head of fastener 920 pushing against sensor board support plate 650, so as to secure sensor board support plate 650 to top enclosure 610. At the same time, due to flange 654 pushing against leaf spring 675, top bearing 620 is secured in top enclosure 610 from top side.

In one embodiment, magnetic member 690 is then secured in the hole 638 in top bearing shaft 630. Next, sensor board 660 is seated on top of sensor board support plate 650. Fastener 930 may insert from top side through hole 668 in sensor board 660 into hole 656 in sensor board support plate 650 to secure sensor board 660 to sensor board support plate 650. In one embodiment, fastener 930 may include a screw with a threaded portion, and hole 656 is manufactured with corresponding thread to receive the threaded portion of fastener 930. Next, top cover 670 is seated on top of top enclosure 610. Fastener 940 may insert through hole 674 (shown in FIGS. 7A-7B) in top cover 670 and hole 618 (shown in FIGS. 7A-7B) in top enclosure 610 in order to secure top cover 670 to top enclosure 610. It should be noted that the above assembly process is described as one example, and is not meant to limit the assembly process of top bracket 600 to the exact process as described. Assembly processes may vary as appropriate to particular applications.

Figure 9:
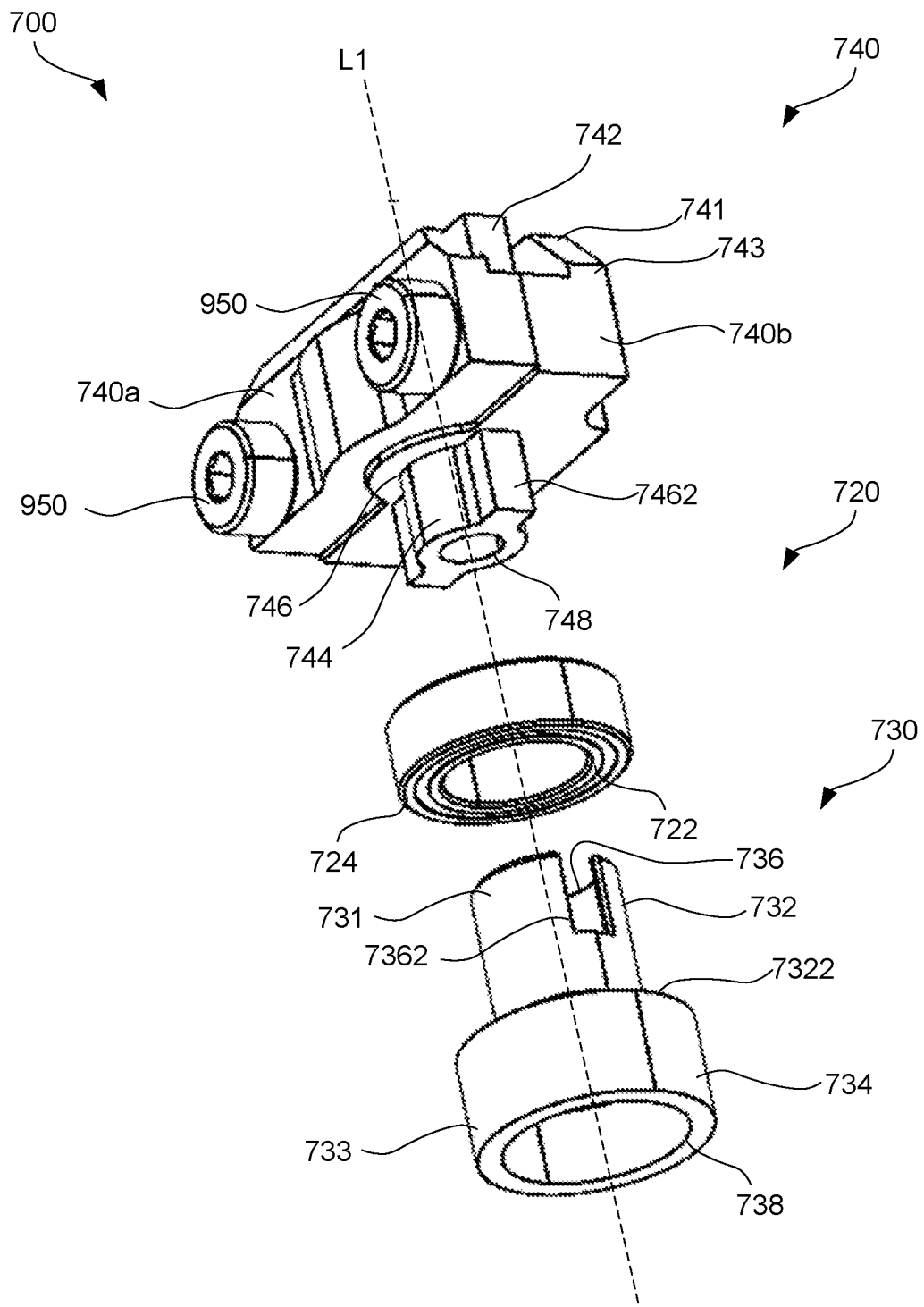
FIG. 9 is a perspective view illustrating a part of a bottom bracket according to certain embodiments.

FIG. 9 is a perspective view illustrating a part of bottom bracket 700 according to certain embodiments. Specifically, FIG. 9 shows bottom bearing shaft 730, bottom bearing 720 and bottom clamp structure 740. As shown in FIG. 9, bottom bearing 720 may include an inner rail 722 and an outer rail 724. In an assembled state, a central axis of bottom bearing 720 is aligned with rotation axis L1 of galvo assembly 10.

As shown in FIG. 9, bottom bearing shaft 730 may include a first end 731 and a second end 733. In one embodiment, bottom bearing shaft 730 is configured to have a cylindrical shape, with a first portion 732 having a first diameter at first end 731 and a second portion 734 having a second diameter greater than the first diameter at second end 733. In an assembled state, a longitudinal axis of bottom bearing shaft 730 is aligned with rotation axis L1 of gavlo assembly 10. A shoulder 7322 is disposed at first portion 732 around an outer circumferential surface of bottom bearing shaft 730. In the assembled state, first portion 732 of bottom bearing shaft 730 may pass through inner rail 722 of bottom bearing 720 and is secured to inner rail 722, with shoulder 7322 pushing against inner rail 722 of bottom bearing 720. In the assembled state, bottom bearing shaft 730 may rotate around rotation axis L1 of gavlo assembly 10. Bottom bearing shaft 730 may include a hole 736 opened from first end 731 and extending at least a part of a length of bottom bearing shaft 730 along the longitudinal axis of bottom bearing shaft 730. In one embodiment, bottom bearing shaft 730 may further include two slots 7362 disposed diametrically around hole 736 and extending a predetermined length along the longitudinal axis of bottom bearing shaft 730. Bottom bearing shaft 730 may further include a hole 738 opened from second end 733 and extending at least a part of the length of bottom bearing shaft 730 along the longitudinal axis of bottom bearing shaft 730. In one embodiment, the diameter of hole 738 is greater than that of hole 736.

As shown in FIG. 9, bottom clamp structure 740 may include a first bottom clamping member 740a and a second bottom clamping member 740b having a first end 741 and a second end 744. In one embodiment, bottom clamp structure 740 is secured at first end 741 to bottom end 520 of the mirror 500, and bottom clamp structure 740 is secured at second end 744 to first portion 732 of bottom bearing shaft 730. In one embodiment, second bottom clamping member 740b may include a clamping portion 743 at first end 741 and engaging portion 746 at second end 744. In one embodiment, first bottom clamping member 740a and second bottom clamping member 740b are secured together by fastener 950 in order to clamp bottom end 520 of mirror 500 (shown in FIG. 5) between first bottom clamping member 740a and clamping portion 743 of second bottom clamping member 740b.

In one embodiment, bottom clamp structure 740 may further include liner member 742 that is disposed between first bottom clamping member 740a and bottom end 520 of mirror 500 (shown in FIG. 5). In one embodiment, liner member 742 may be made of appropriate materials having less hardness than that of mirror 500 (e.g., acrylic resin) to prevent damage to mirror 500 caused by the clamping effect of the bottom clamp structure 740.

As shown in FIG. 9, in one embodiment, engaging portion 746 is configured to have a cylindrical shape to make engaging portion 746 insert into hole 736 of bottom bearing shaft 730. As shown in FIG. 9, engaging portion 746 may further include two keys 7462 disposed diametrically around the circumferential surface of engaging portion 746. In an assembled state, one key 7462 may insert in one slot 7362, while the other key 7462 may insert in the other slot 7362. Bottom clamp structure 740 may rotate around rotation axis L1 by virtue of the engagement of keys 7462 and slots 7362. Second bottom clamping member 740b of bottom clamp structure 740 may further include a hole 748 opened from second end 744 and extending along rotation axis L1. In one embodiment, hole 748 is a through hole passing through second end 744 to first end 741 of second bottom clamping member 740*b*.

As shown in FIG. 9, bottom bearing shaft 730 may include a hole 738 opened from second end 733 and extending along the longitudinal axis of bottom bearing shaft 730 to communicate with the hole 736. In an assembled state, a fastener (not shown) may insert through hole 738 of bottom bearing shaft 730 and hole 748 of bottom clamp structure 740 to secure them together. In one embodiment, the fastener may include a screw with a threaded portion, and hole 748 may be manufactured with corresponding thread to receive the threaded portion of the screw.

Figures 10A, 10B:
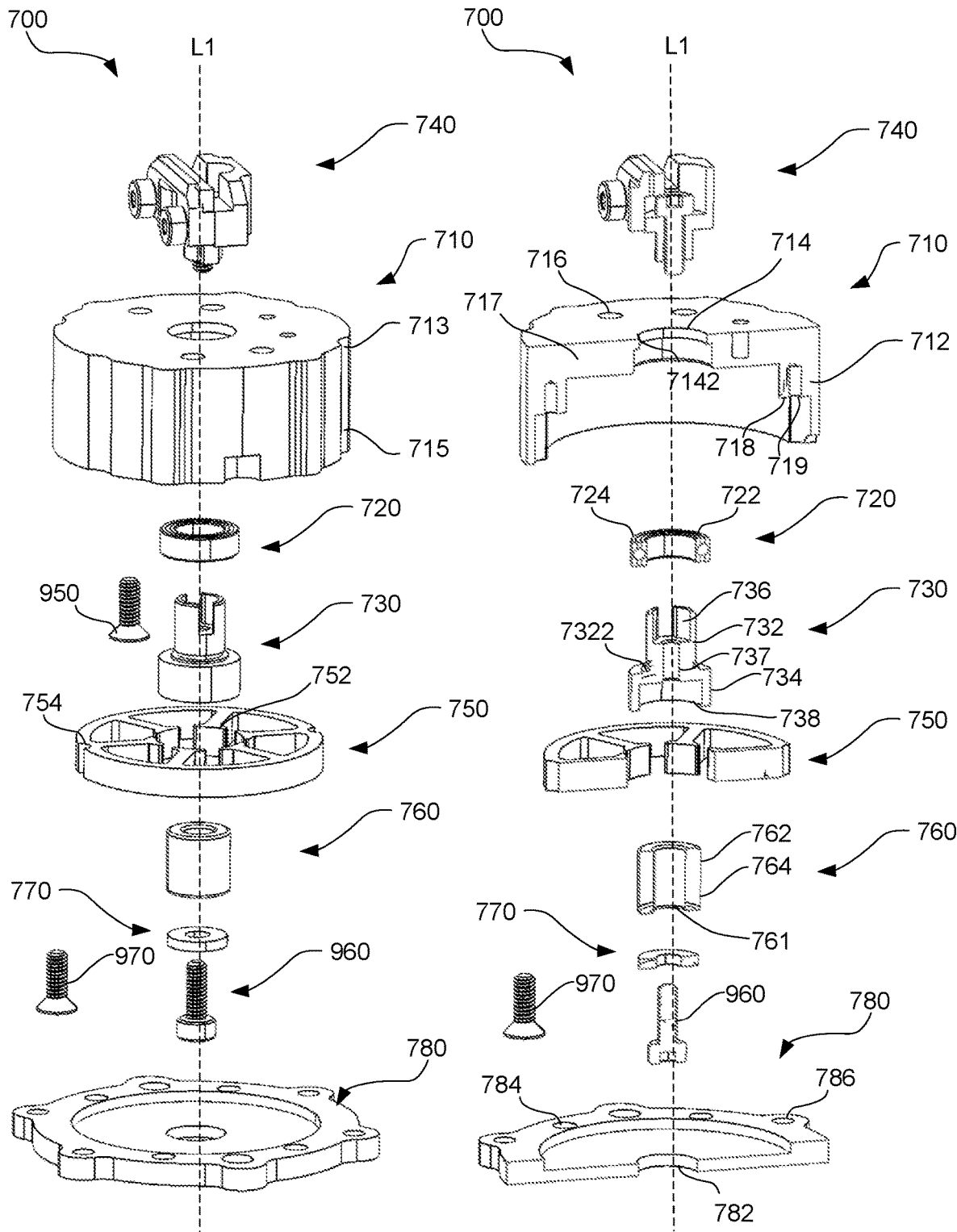
FIGS. 10A-10B illustrate a bottom bracket according to certain embodiments, where

FIGS. 10A-10B illustrate a bottom bracket 700 according to certain embodiments. FIG. 10A is a perspective view illustrating the bottom bracket 700, and FIG. 10B is a perspective and cross-sectional view illustrating the bottom bracket 700. It should be noted some elements, such as fasteners, are omitted for clarity of illustration. Specifically, FIGS. 10A-10B illustrate bottom enclosure 710, bottom bearing 720, bottom bearing shaft 730, bottom clamp structure 740, driving coil 750, driven magnetic member 760, gasket 770, and bottom cover 780. Additionally, FIGS. 10A-10B also illustrate fastener 970.

As shown in FIGS. 10A-10B, bottom bracket 700 may include bottom enclosure 710. In one embodiment, bottom enclosure 710 is configured to be a cylindrical shape, including an outer wall 712. Bottom enclosure 710 may include a first end 713 closed by an end wall 717 and a second end 715 left open. A central hole 714 is disposed in end wall 717. In one embodiment, central hole 714 may include a flange 7142 at first end 713 of bottom enclosure 710. In one embodiment, bottom enclosure 710 may further include multiple shoulders 718 (such as two or four) protruding from end wall 717 inside bottom enclosure 710 along a longitudinal axis of bottom enclosure 710. A hole 719 is manufactured in shoulder 718 for securing driving coil 750 to bottom enclosure 710 as described in detail below.

As shown in FIGS. 10A-10B, bottom bracket 700 may include bottom bearing 720 having an inner rail 722 and an outer rail 724. In an assembled state, bottom bearing 720 is seated in central hole 714 of bottom enclosure 710 with outer rail 724 pushing against flange 7142.

As shown in FIGS. 10A-10B, bottom bearing shaft 730 may include first portion 732 and second portion 734. Shoulder 7322 is disposed around first portion 732 at an interface between first portion 732 and second portion 734. In one embodiment, shoulder 7322 is configured to push against inner rail 722 of bottom bearing 720 when first portion 732 of bottom bearing shaft 730 is secured to bottom enclosure 710. Bottom bearing shaft 730 may include a connecting hole 737 connecting hole 738 and hole 736.

As shown in FIGS. 10A-10B, bottom bracket 700 may include driving coil 750. In one embodiment, driving coil 750 is configured to be a disc shape with a central hole 752. In one embodiment, driving coil 750 is disposed around driven magnetic member 760. Driving coil 750 may include indents 754 disposed circumferentially around an outer perimeter of driving coil 750. A fastener 950 may insert through indent 754 into hole 719 in should 718 of bottom enclosure 710, in order to secure driving coil 750 to bottom enclosure 710. In one embodiment, fastener 950 may include a screw with a threaded portion, and hole 719 is manufactured with corresponding threads to receive the threaded portion of fastener 950.

As shown in FIGS. 10A-10B, driven magnetic member 760 is configured to be a cylindrical shape with a central hole 761. Driven magnetic member 760 may include a first portion 762 and a second portion 764. In one embodiment, first portion 762 and second portion 764 may each include a half of the length of driven magnetic member 760 along its longitudinal axis. In an assembled state, first portion 762 of driven magnetic member 760 may insert in the hole 738 of bottom bearing shaft 730, while driving coil 750 surround second portion of driven magnetic member 760.

As shown in FIGS. 10A-10B, bottom bracket 700 may include gasket 770. In one embodiment, a fastener 960 may pass through gasket 770 and central hole 761 of driven magnetic member 760 and insert in connecting hole 737 of bottom bearing shaft 730 to secure driven magnetic member 760 to bottom bearing shaft 730. In operation, bottom bearing shaft 730 may rotate around rotation axis L1 due to outer rail 724 of bottom bearing 720 pushing against flange 7142 in central hole 714 of bottom enclosure 710 and shoulder 7322 of bottom bearing shaft 730 pushing against inner rail 722 of bottom bearing 720. In one embodiment, fastener 960 includes a screw with a threaded portion, and connecting hole 737 is manufactured with corresponding thread to receive the threaded portion of the screw.

As shown in FIGS. 10A-10B, bottom bracket 700 may include bottom cover 780. In one embodiment, bottom cover 780 is configured to be a disc shape with a central hole 782. In one embodiment, central hole 782 may provide passage for wires used to power driving coil 750. Bottom cover 780 may include a first set of holes 784 disposed circumferentially around bottom cover 780. In one embodiment, a fastener 970 may insert through hole 784 into hole 716 in bottom enclosure 710 to secure bottom cover 780 to bottom enclosure 710. Bottom cover 780 may include a second set of holes 786. A fastener (not shown) may insert in hole 786 to secure bottom cover 780 to another structure, such as a chassis of a LiDAR system.

Figure 11:
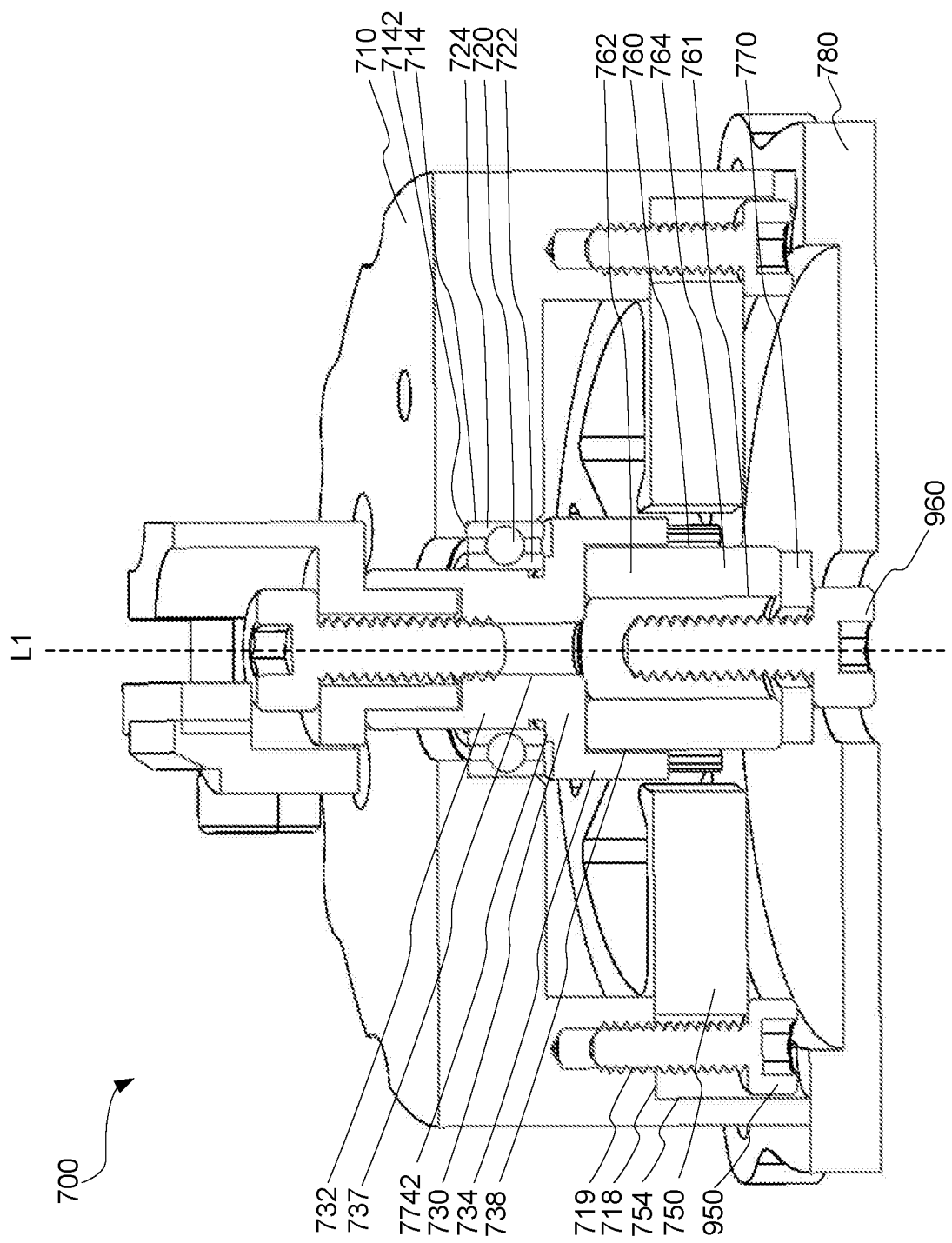
FIG. 11 is a perspective and cross-sectional view illustrating an assembled bottom bracket according to certain embodiments.

FIG. 11 is a perspective and cross-sectional view illustrating an assembled bottom bracket 700 according to certain embodiments. An example of an assembly process will be described with reference to FIG. 11. As shown in FIG. 11, bottom bearing 720 is seated in the central hole 714 of bottom enclosure 710, with outer rail 724 pushing against flange 7142 of the central hole 714. First portion 732 of bottom bearing shaft 730 inserts from bottom side into bottom bearing 720, with the shoulder 7322 of the bottom bearing shaft 730 pushing against inner rail 722 of bottom bearing 720, thereby securing bottom bearing 720 to bottom enclosure 710.

Then, first portion 762 of driven magnetic member 760 may insert into hole 738 in bottom bearing shaft 730. Gasket 770 is seated against bottom end of driven magnetic member 760. Fastener 960 may insert from bottom side through gasket 770 and central hole 761 of driven magnetic member 760 into connecting hole 737 in bottom bearing shaft 730, with the head of fastener 960 pushing against gasket 770, in order to secure driven magnetic member 760 to bottom bearing shaft 730. In one embodiment, fastener 960 may include a screw with a threaded portion, and connecting hole 737 is manufactured with corresponding thread to receive the threaded portion of fastener 960.

Then, as shown in FIG. 11, driving coil 750 is seated from bottom side on shoulder 718 in bottom enclosure 710. Fastener 950 may insert from bottom side through indent 754 of driving coil 750 into hole 719 in shoulder 718 of bottom enclosure 710, with the head of fastener 950 pushing against driving coil 750, so as to secure driving coil 750 to bottom enclosure 710. After driving coil 750 secured to bottom enclosure 710, driving coil 750 is configured to surround second portion 764 of driven magnetic member 760.

Next, as shown in FIG. 11, bottom cover 780 is seated from bottom side on bottom enclosure 710. Fastener 970 (as shown in FIGS. 10A-10B) may insert through hole 784 (as shown in FIGS. 10A-10B) in hole 716 (as shown in FIGS. 10A-10B) in bottom enclosure 710 to secure bottom cover 780 to bottom enclosure 710. It should be noted that the above assembly process is described as one example, and not mean to limit the assembly of bottom bracket 700 to the exact process as described. Assembly processes may vary as appropriate to particular applications.

Figures 12A, 12B:
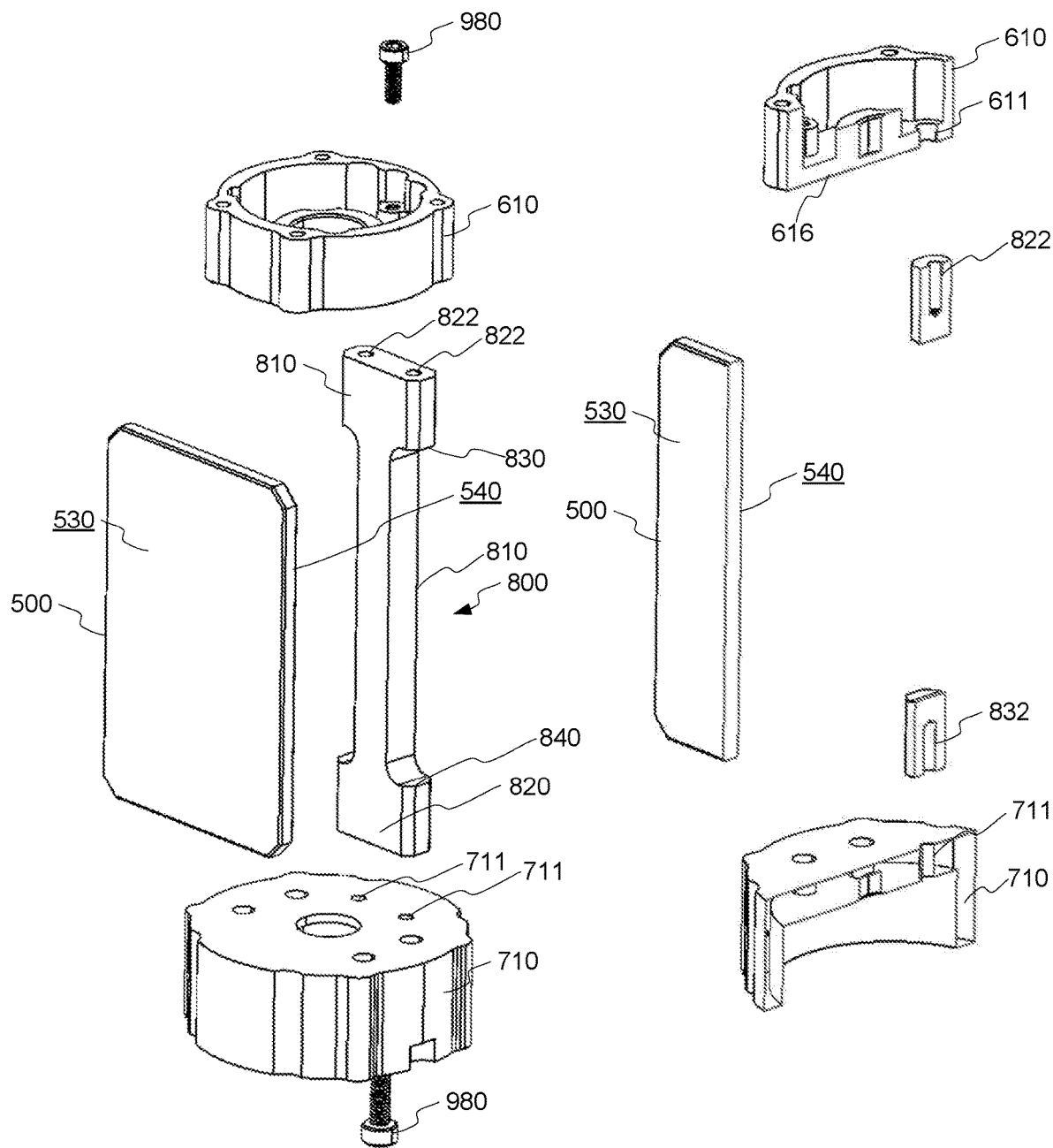
FIGS. 12A-12B are perspective views illustrating a part of a galvo assembly according to certain embodiments, where

FIGS. 12A-12B are perspective views illustrating a part of galvo assembly 10 according to certain embodiments, wherein FIG. 12B illustrates a cross section of the part of galvo assembly 10 as shown in FIG. 12A to further illustrate internal structures. Specially, FIGS. 12A-12B show top enclosure 610 of top bracket 600, mirror 500, enhance plate 800, and bottom enclosure 710 of bottom bracket 700. As shown in FIG. 12A, mirror 500 may include optical surface 530 and a back surface 540 opposite optical surface 530.

As shown in FIG. 12A, enhance plate 800 may be connected between top enclosure 610 and bottom enclosure 710. In one embodiment, enhance plate 800 may extend along back surface 540 and spaced from back surface 540 to prevent interference with rotation of mirror 500 in operation. In one embodiment, enhance plate 800 is configured to be an elongated rectangular plate with first end 810 and second end 820. Enhance plate 800 may include two shoulders 830 at first end 810 and two shoulders 840 at second end 820. In one embodiment, one blind hole 822 is provided in each shoulder 830 along the longitudinal axis of enhance plate 800, wherein blind hole 822 opens from first end 810 of enhance plate 800. Similarly, one blind hole 832 (shown in FIG. 12B) is provided in each shoulder 840 along the longitudinal axis of enhance plate 800, wherein blind hole 832 opens from second end 820 of enhance plate 800.

As shown FIG. 12B, a hole 611 is provided in end wall 616 of top enclosure 610. Similarly, a hole 711 is provided in end wall 717 of bottom enclosure 710. A fastener 980 (shown in FIG. 12A) may insert from top side through hole 611 into blind hole 822, with the head of fastener 980 pushing against end wall 616 of top enclosure 610, so as to secure top enclosure 610 with enhance plate 800. Similarly, a fastener 980 (shown in FIG. 12A) may insert from bottom side through hole 711 into blind hole 832, with the head of fastener 980 pushing against end wall 717 of bottom enclosure 710, so as to secure bottom enclosure 710 with enhance plate 800. In one embodiment, fastener 980 includes a screw with a threaded portion, and blind holes 822 and 832 may be manufactured with corresponding threads to receive the threaded portion of fastener 980.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A galvanometer (galvo) mirror assembly for light detection and ranging, the galvo mirror assembly comprising:
    a top bracket including a first rotatable unit configured to rotate around an axis;
    a bottom bracket aligned with the top bracket and including a second rotatable unit configured to rotate around the axis;
    a mirror including a top end and a bottom end, wherein the top end of the mirror is coupled to the first rotatable unit of the top bracket and the bottom end of the mirror is coupled to the second rotatable unit of the bottom bracket, such that the mirror is rotatable around the axis; and
    an enhance plate extending between and non-rotatably coupled to the top bracket and the bottom bracket, wherein the enhance plate is spaced apart from the mirror.

2. The galvo mirror assembly of claim 1 wherein the top bracket comprises:
    a top enclosure; and
    the first rotatable unit including:
        a top bearing in the top enclosure;
        a top bearing shaft having a first portion and a second portion, wherein the first portion of the top bearing shaft is in the top bearing and is rotatable around the axis; and
        a top clamp structure having a first top portion and a second top portion, wherein the first top portion of the top clamp structure is coupled to the second portion of the top bearing shaft, and wherein the second top portion of the top clamp structure is coupled to the top end of the mirror.

3. The galvo mirror assembly of claim 2 wherein the top bearing shaft comprises a first hole opened at the second portion thereof, and wherein the first top portion of the top clamp structure is at least partially in the first hole.

4. The galvo mirror assembly of claim 3 wherein the top bearing shaft comprises two first slots disposed diametrically around the first hole and extending along the axis, and wherein the first top portion of the top clamp structure comprises two first keys disposed diametrically and each inserted in a respective one of the two first slots.

5. The galvo mirror assembly of claim 3 wherein the top bracket further comprises a first fastener, wherein the top bearing shaft comprises a second hole extending along the axis, wherein the top clamp structure comprises a third hole extending along the axis, and wherein the first fastener couples the top clamp structure to the top bearing shaft through the second hole and the third hole.

6. The galvo mirror assembly of claim 2 wherein the top clamp structure comprises:
    a first top clamping member; and
    a second top clamping member having a top clamping portion and a top securing portion, wherein the top clamping portion of the second top clamping member is engaged with the first top clamping member to clamp the top end of the mirror therebetween, and wherein the top securing portion of the second top clamping member is coupled to the second portion of the top bearing shaft.

7. The galvo mirror assembly of claim 6 wherein the top clamp structure further comprises:
    a liner member disposed between the first top clamping member and the top end of the mirror, wherein a hardness of the liner member is less than a hardness of the mirror.

8. The galvo mirror assembly of claim 2, further comprising:
    a sensor board support plate coupled to the top enclosure;
    a sensor board coupled to the sensor board support plate, wherein the sensor board comprises a socket to mount a sensor; and
    a magnetic member coupled to the first portion of the top bearing shaft and rotatable around the axis, wherein the sensor is configured to detect a rotation angle of the magnetic member.

9. The galvo mirror assembly of claim 8, further comprising:
    a top cover coupled to the top enclosure, wherein the top cover comprises a hole through which a portion of the sensor board protrudes.

10. The galvo mirror assembly of claim 2 wherein the enhance plate is coupled to the top enclosure.

11. The galvo mirror assembly of claim 1 wherein the bottom bracket comprises:
a bottom enclosure having a bottom central hole; and
the second rotatable unit including:
a bottom bearing having an inner rail and an outer rail, wherein the outer rail is coupled to the bottom central hole;
a bottom bearing shaft having a third portion and a fourth portion, wherein the third portion of the bottom bearing shaft is in the bottom bearing and is rotatable around the axis; and
a bottom clamp structure having a first bottom portion and a second bottom portion, wherein the first bottom portion of the bottom clamp structure is coupled to the bottom end of the mirror, and wherein the second bottom portion of the bottom clamp structure is coupled to the third portion of the bottom bearing shaft.

12. The galvo mirror assembly of claim 11, wherein the bottom bearing shaft comprises a fifth hole opened at the third portion thereof, and wherein the second bottom portion of the bottom clamp structure is in the fifth hole.

13. The galvo mirror assembly of claim 12 wherein the bottom bearing shaft comprises two second slots disposed diametrically around the fifth hole and extending along the axis, and wherein the second bottom portion of the bottom clamp structure comprises two second keys disposed diametrically and each inserted in a respective one of the two second slots.

14. The galvo mirror assembly of claim 12 wherein the bottom bracket further comprises a second fastener, wherein the bottom bearing shaft comprises a sixth hole extending along the axis, wherein the bottom clamp structure comprises a seventh hole extending along the axis, and wherein the second fastener couples the bottom clamp structure to the bottom bearing shaft through the sixth hole and the seventh hole.

15. The galvo mirror assembly of claim 11 wherein the bottom bearing shaft includes a shoulder disposed around an outer circumferential surface of the third portion of the bottom bearing shaft, and wherein the shoulder of the bottom bearing shaft pushes against the inner rail of the bottom bearing.

16. The galvo mirror assembly of claim 11, further comprising:
a driven magnetic member having a first driven portion and a second driven portion, wherein the first driven portion of the driven magnetic member is engaged with the fourth portion of the bottom bearing shaft; and
a driving coil disposed around the second driven portion of the driven magnetic member within the bottom enclosure.

17. The galvo mirror assembly of claim 11 wherein the enhance plate is coupled to the bottom enclosure.

18. The galvo mirror assembly of claim 11, further comprising:
a bottom cover coupled to the bottom enclosure.

19. The galvo mirror assembly of claim 11 wherein the bottom clamp structure comprises:
a first bottom clamping member; and
a second bottom clamping member having a bottom clamping portion and a bottom securing portion, wherein the bottom clamping portion of the second bottom clamping member is engaged with the first bottom clamping member to clamp the bottom end of the mirror therebetween, and wherein the bottom securing portion of the second bottom clamping member is coupled to the third portion of the bottom bearing shaft.

20. The galvo mirror assembly of claim 19 wherein the bottom clamp structure further comprises:
a liner member disposed between the first bottom clamping member and the bottom end of the mirror, wherein a hardness of the liner member is less than a hardness of the mirror.

* * * * *